(12) United States Patent
Nishimura

(10) Patent No.: US 7,382,550 B2
(45) Date of Patent: Jun. 3, 2008

(54) ZOOM LENS AND IMAGE-PICKUP APPARATUS HAVING THE SAME

(75) Inventor: Takeshi Nishimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 11/466,150

(22) Filed: Aug. 22, 2006

(65) Prior Publication Data

US 2007/0058265 A1    Mar. 15, 2007

(30) Foreign Application Priority Data

Sep. 12, 2005   (JP)   ............................. 2005-263889

(51) Int. Cl.
*G02B 15/14* (2006.01)
(52) U.S. Cl. ...................... 359/686; 359/683
(58) Field of Classification Search ................ 359/683, 359/686
See application file for complete search history.

(56) References Cited

U.S. PATENT DOCUMENTS

| 5,559,635 A | 9/1996 | Sato |
| 5,774,267 A | 6/1998 | Kodama et al. |
| 5,847,875 A | 12/1998 | Kodama et al. |
| 5,969,881 A | 10/1999 | Konno |
| 7,075,730 B2 * | 7/2006 | Nishimura .................. 359/686 |

FOREIGN PATENT DOCUMENTS

| JP | 07-064025 A | 3/1995 |
| JP | 09-113808 A | 5/1997 |
| JP | 10-161024 A | 6/1998 |
| JP | 2004-061910 A | 2/2004 |

* cited by examiner

*Primary Examiner*—William C Choi

(57) ABSTRACT

At least one exemplary embodiment is directed to a zoom lens which includes first to fourth lens groups, each moving and having negative, positive, negative, and positive refractive power, arranged from an object to an image in that order. The second lens group includes a second A lens component composed of a single positive lens, and a second B lens component composed of a negative lens and a positive lens with positive refractive power as a whole, arranged from the object to the image in that order. The second A lens component displaces images in a direction substantially perpendicular to an optical axis by having a component of it's displacement perpendicular to the optical axis, and the zoom lens satisfies the following condition: $0.2 < f2/f2A < 0.6$, where f2A and f2 are focal lengths of the second A lens component and the second lens group, respectively.

12 Claims, 16 Drawing Sheets

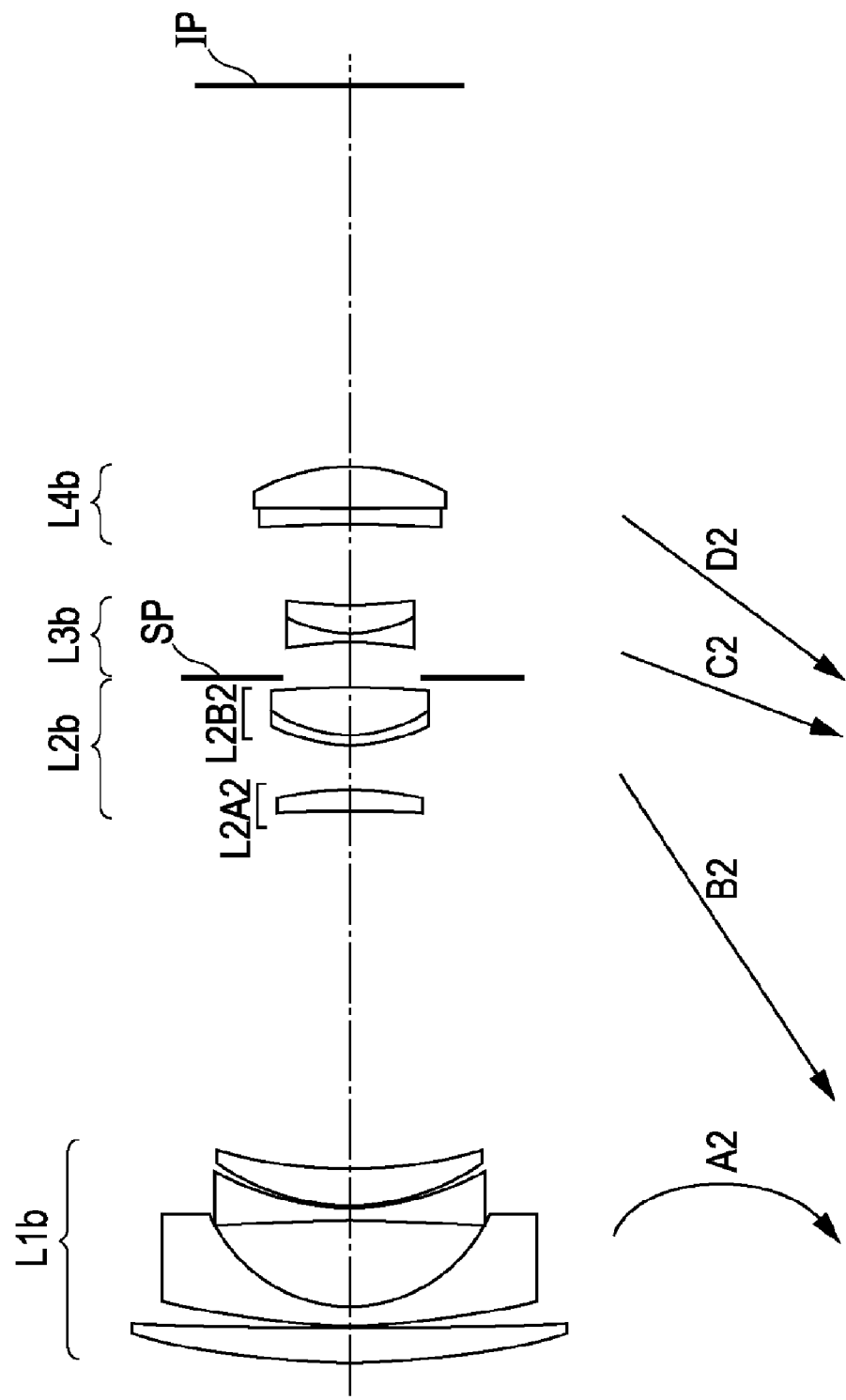

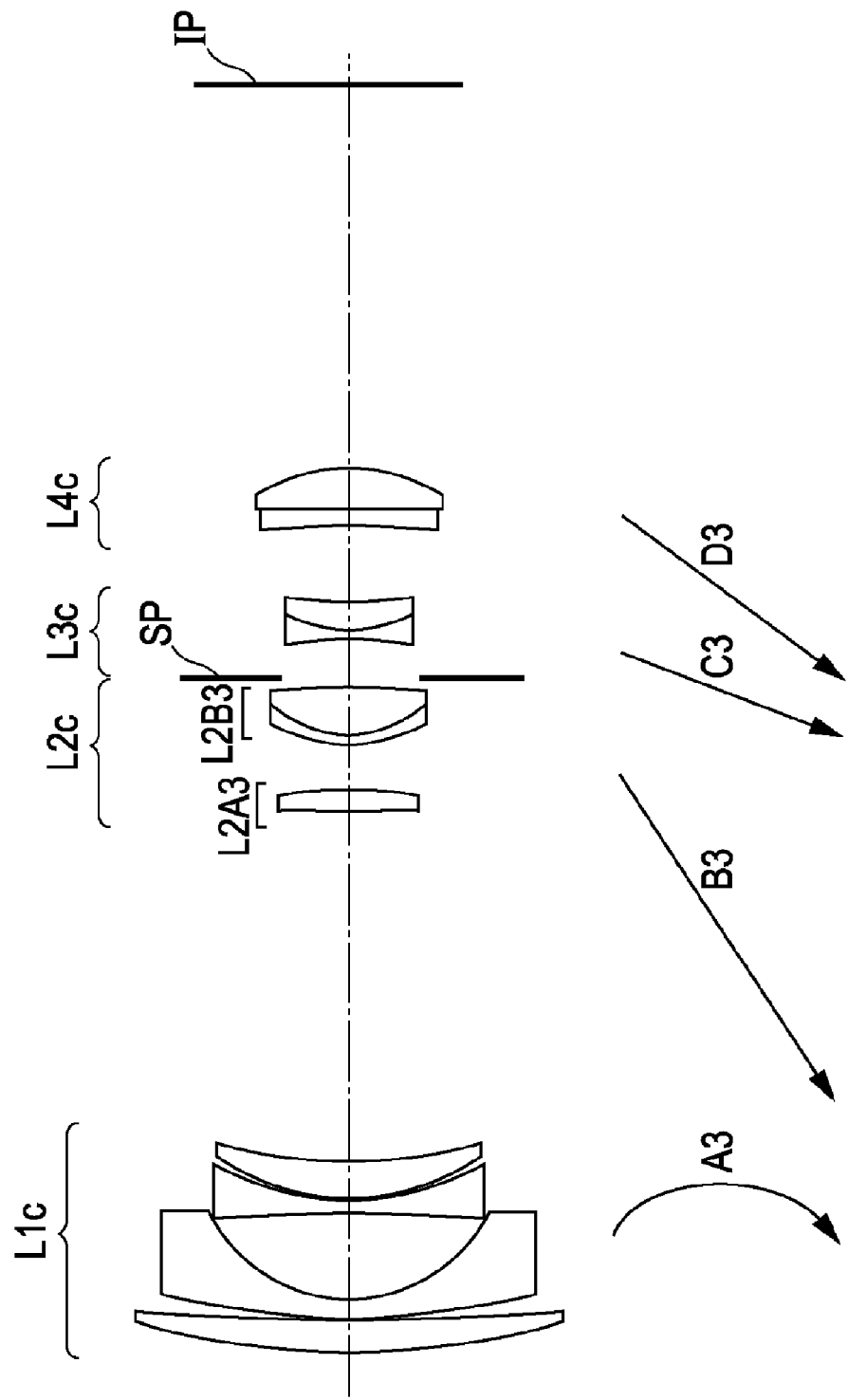

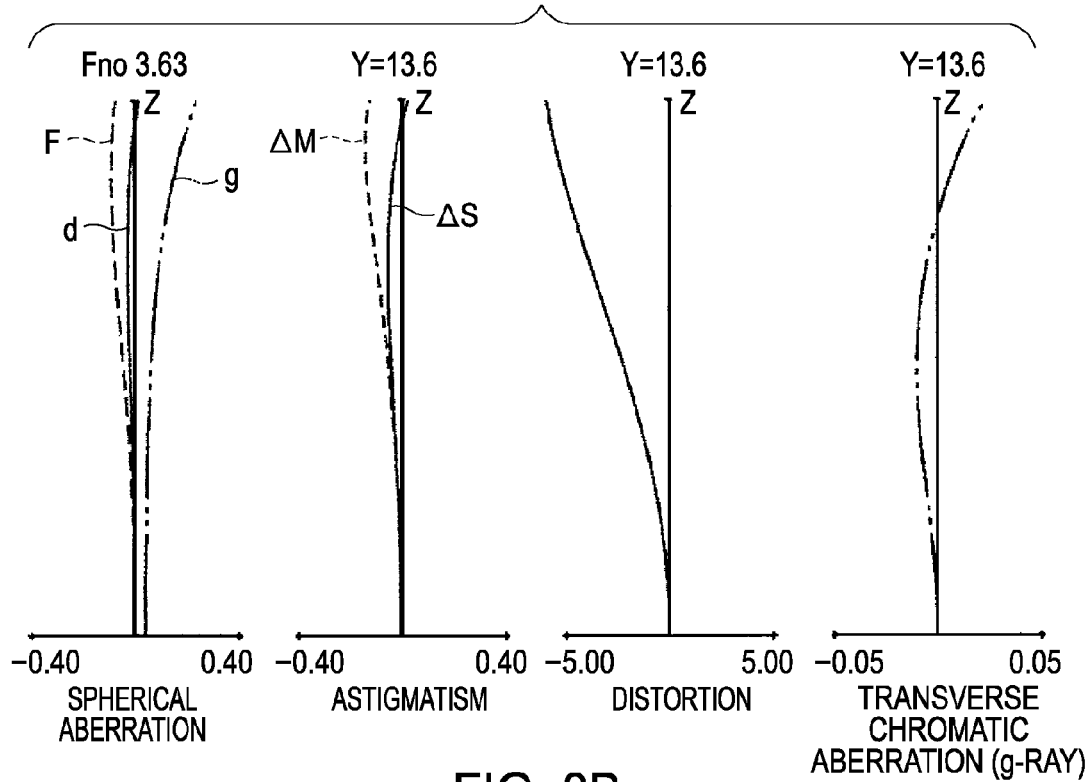
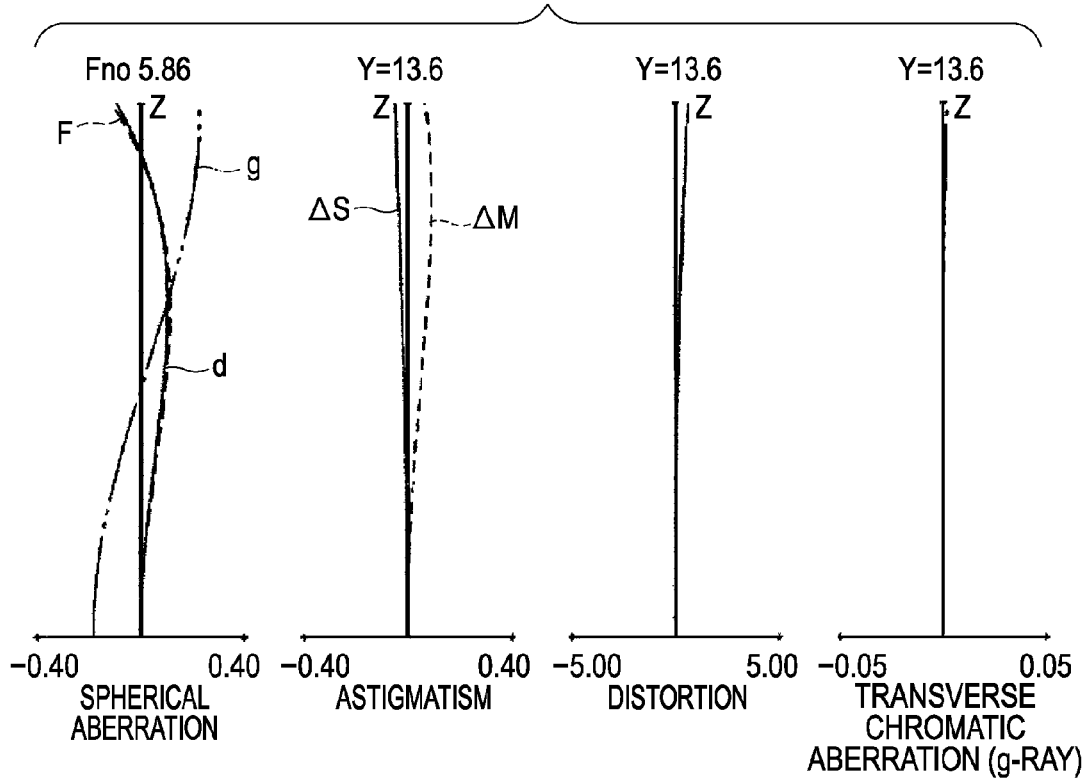

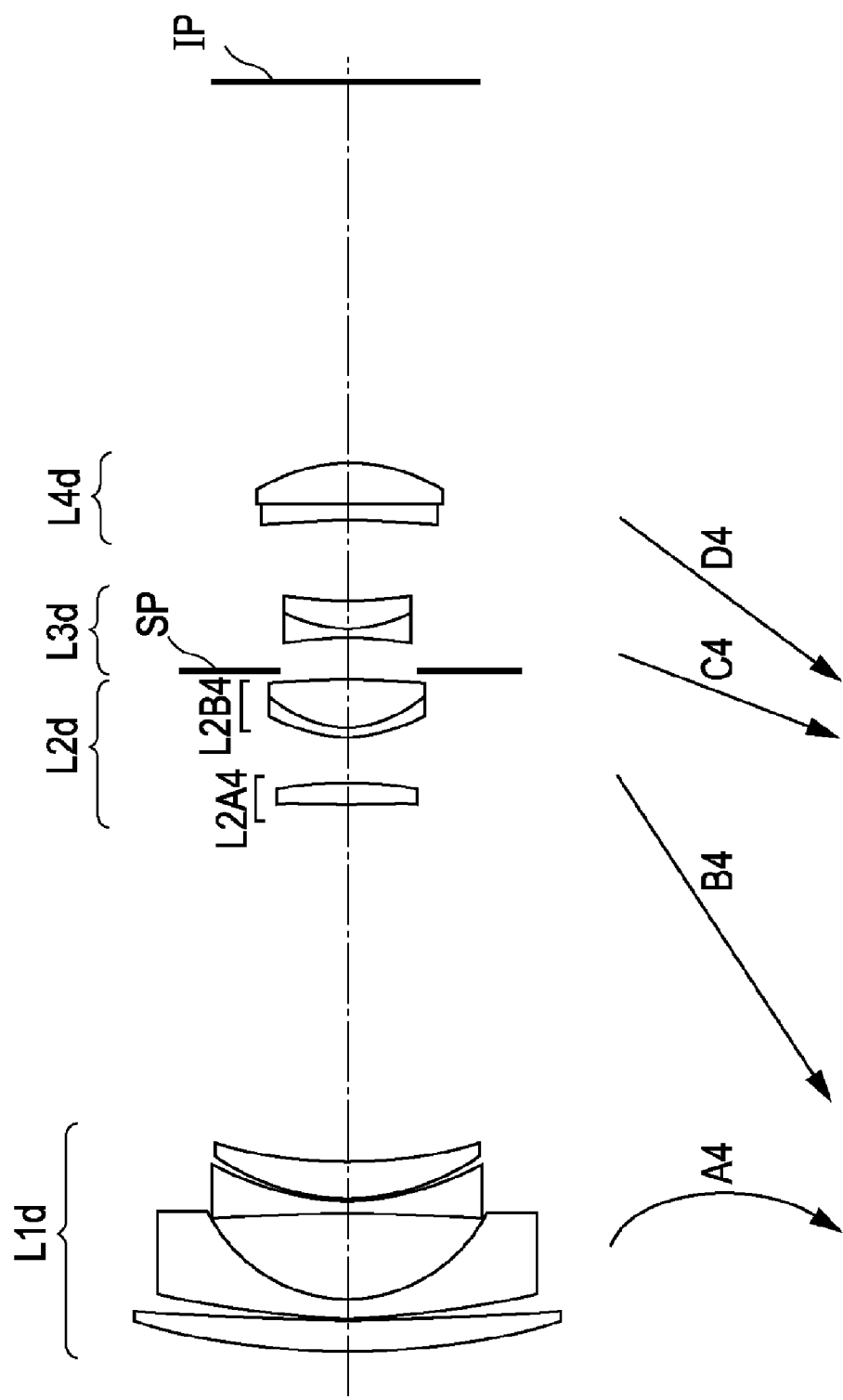

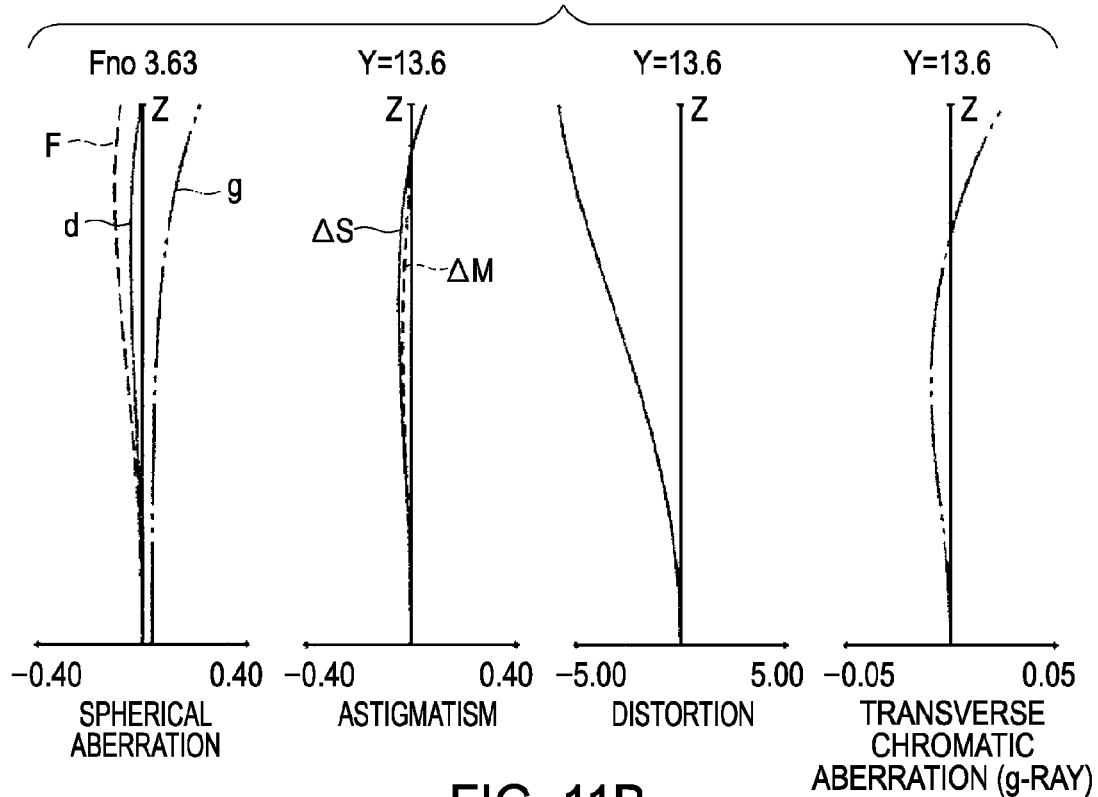
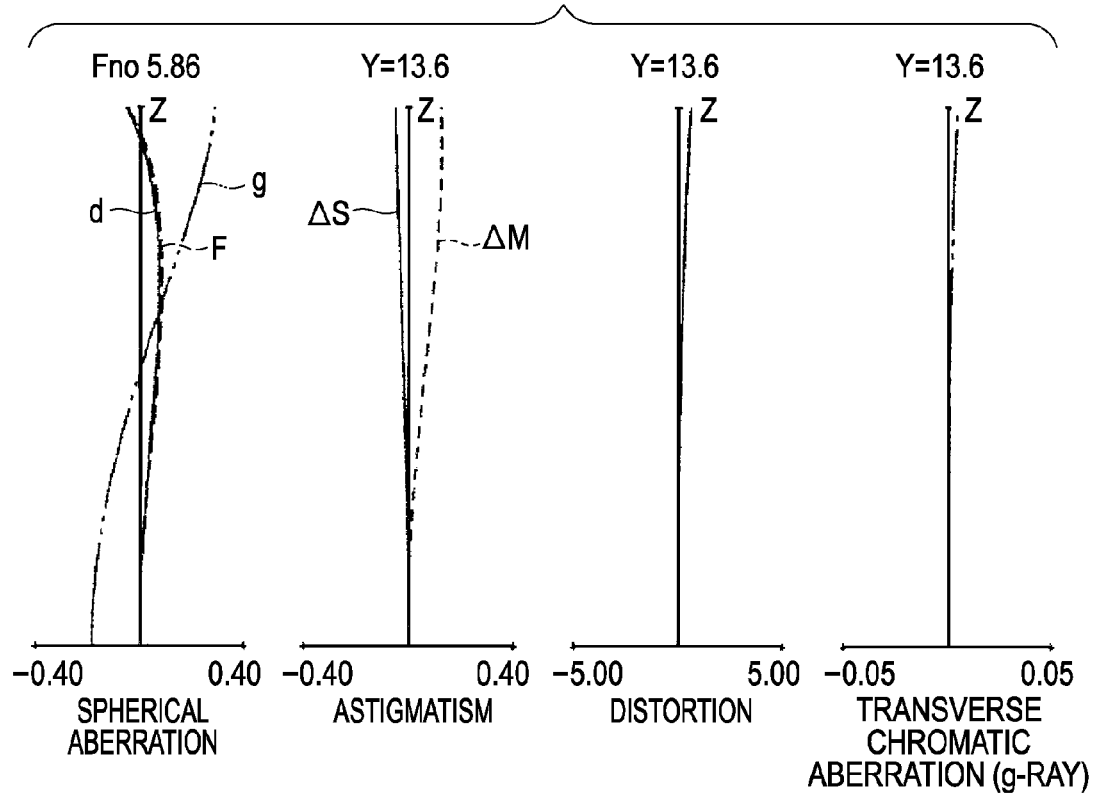

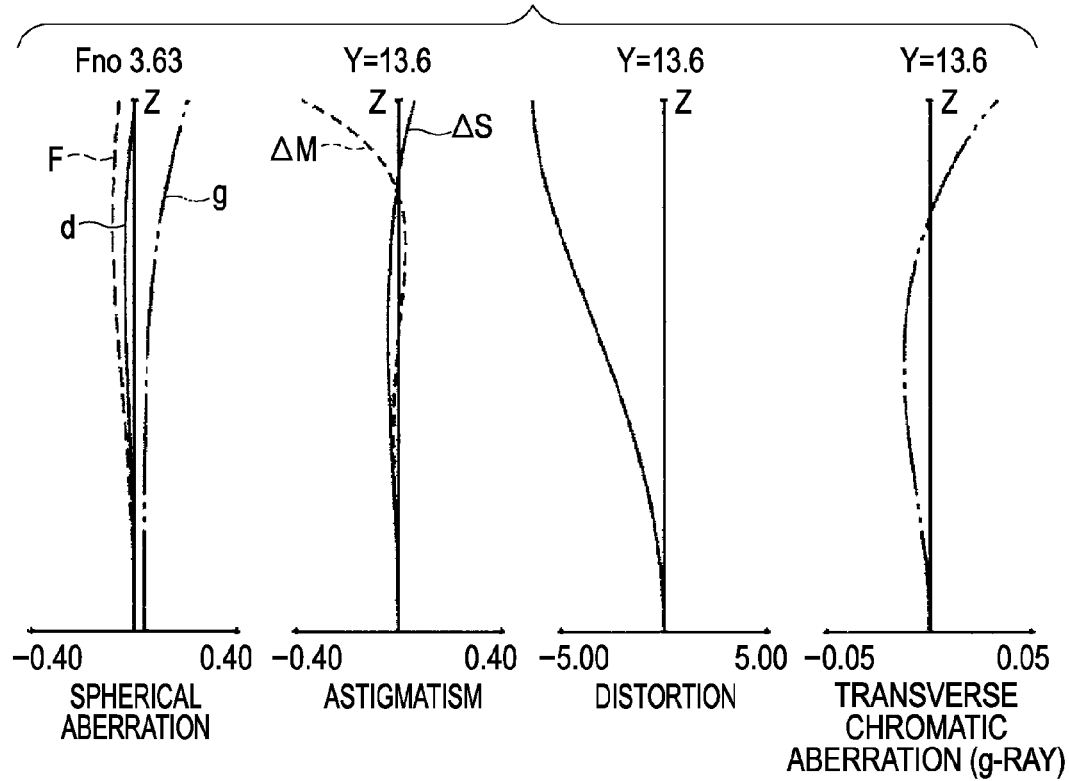
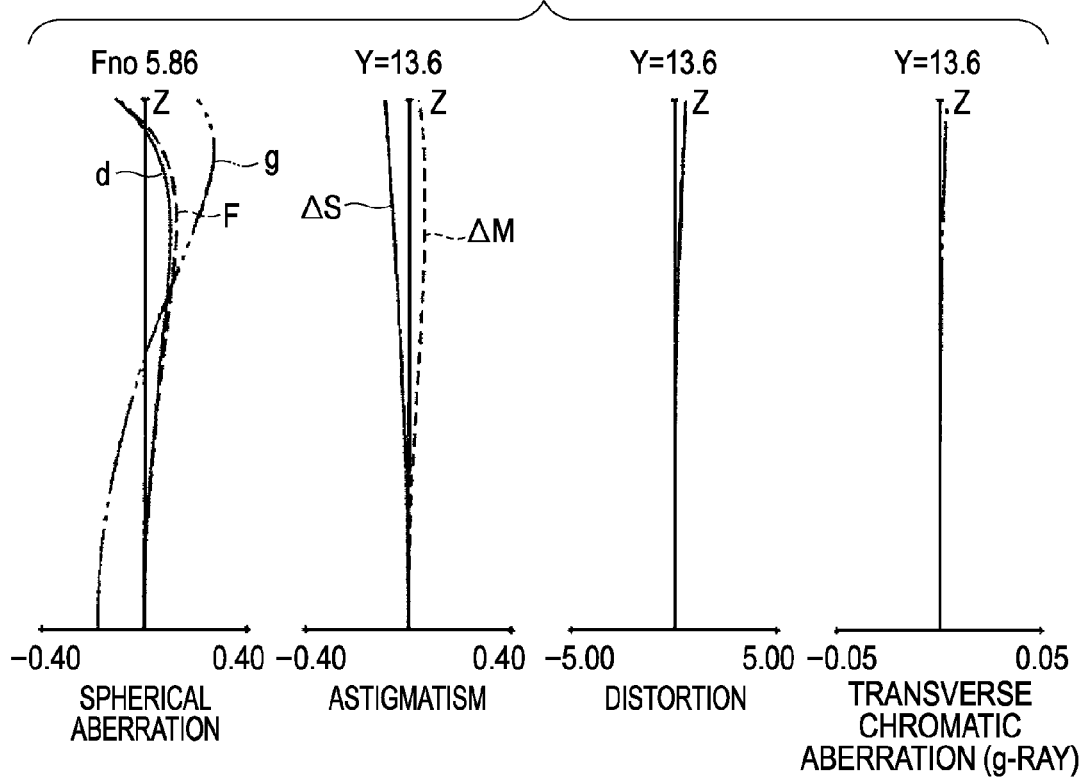

ZOOM LENS AND IMAGE-PICKUP APPARATUS HAVING THE SAME

BACKGROUND OF THE INVENTION

1. Field of the Invention

The present invention relates to zoom lenses, more particularly though not exclusively, to zoom lenses used in image-pickup apparatuses.

2. Description of the Related Art

Recently, image-pickup apparatuses, such as a photographic camera, a video camera, and a digital camera, have been demanded to have higher quality images.

Furthermore, because of the expansion in shooting conditions, it would be useful for the lenses used in these apparatuses to be zoom lenses having image stabilizing performances for correcting blurring due to camera shake.

A method of compensating vibration includes decentering selected lens groups arranged in parallel with a direction substantially perpendicular to an optical axis. This method needs no additional optical system for compensating vibration.

This method also has merits that the lens groups for vibration compensating can be mostly simplified and an actuator for vibration compensating can be miniaturized by suppressing a drive torque.

On the other hand, there is a so-called negative lead type zoom lens in that a lens group with negative refractive power is preceding (located at a position closest to an object). In this zoom lens, a distance of contact shooting is comparatively small, a shooting field angle can be increased rather easily, and a back focus can be increased comparatively easily so as to be frequently used in a wide-field angle taking lens.

A two-group zoom lens composed of first and second lens groups with negative and positive refractive power arranged from the object in that order, has been known as the negative lead type zoom lens having image stabilizing performances (Japanese Patent Laid-Open No. 10-161024 and No. 7-64025). In this two-lens group, the vibration is compensated by moving part of the second lens group in a direction substantially perpendicular to the optical axis.

Also, a four-group zoom lens, composed of first to fourth lens groups with negative, positive, negative, and positive refractive power arranged from the object in that order, has been known, in which the vibration is compensated by moving part of the second lens group in a direction substantially perpendicular to the optical axis (Japanese Patent Laid-Open No. 9-113808 and No. 2004-61910).

In the two-group zoom lens discussed in Japanese Patent Laid-Open No. 10-161024 and No. 7-64025, the variable power is given only to the second lens group. Hence, when the lens is zoomed at a high ratio, the variations in aberration due to the zooming are difficult to be suppressed.

Since the displacement of the second lens group during zooming is comparatively large relative to the zoom ratio, the entire lens system is difficult to be miniaturized.

The vibration is compensated by parallel decentering part of the second lens group; however, when the lens is zoomed at a high ratio, the increasing tendency of aberration due to the vibration compensating has been shown.

In the four-group zoom lens discussed in Japanese Patent Laid-Open No. 9-113808 and No. 2004-61910, the vibration is compensated by moving a plurality of lenses in a direction substantially perpendicular to the optical axis, so that the weight of the moving part is increased and the lens frame therefore is also increased in size. Thus, a large load is applied to a drive system for correcting the blurring (compensating the vibration), resulting in an increasing tendency in size of the camera shake drive system.

When the vibration is compensated by decentering the lens, there can be a delayed response in decentering the lens.

In the zoom lens having a image stabilizing mechanism for use in a high quality image-pickup apparatus, it would be useful that the lens for correcting the image blur is small in size and weight and the deterioration in optical performances is small during compensating the vibration.

SUMMARY OF THE INVENTION

At least one exemplary embodiment is directed to zoom lenses used in image-pickup apparatus (e.g., a digital still camera, a video camera, and a surveillance camera) using solid state image devices.

An exemplary embodiment of the present invention is directed to a zoom lens where the load of a driving device, configured to compensate for vibration (image stabilizer), is small, and the entire apparatus can be miniaturized. Additionally an exemplary embodiment efficiently compensates for the vibration and can include an image-pickup apparatus having the zoom lens.

A zoom lens according to at least one exemplary embodiment of the present invention includes a first lens group with negative refractive power, a second lens group with positive refractive power, a third lens group with negative refractive power, and a fourth lens group with positive refractive power, which are arranged from an object side to an image side in that order. Each of the lens groups moves so that the space between the first lens group and the second lens group is reduced, the space between the second lens group and the third lens group is increased, and the space between the third lens group and the fourth lens group is reduced, at a telephoto end in comparison with spacing at a wide angle end. The second lens group includes a second A lens component composed of a single positive lens, and a second B lens component composed of a negative lens and a positive lens with positive refractive power as a whole, which are arranged from the object side to the image side in that order. The second A lens component displaces images in a direction substantially perpendicular to an optical axis by having a component of it's displacement perpendicular to the optical axis, and in which the zoom lens satisfies the following condition:

$$0.2 < f2/f2A < 0.6,$$

where f2A and f2 are focal lengths of the second A lens component and the second lens group, respectively.

A zoom lens according to at least one exemplary embodiment of the present invention includes a first lens group with negative refractive power; a second lens group with positive refractive power; an aperture stop; and trailing lens groups, which are arranged from an object side to an image side in that order. The space between the first lens group and the second lens group is changed during zooming, and the second lens group includes a second A lens component composed of a single positive lens, and a second B lens component composed of a negative lens and a positive lens with positive refractive power as a whole, which are arranged from the object side to the image side in that order. The second A lens component displaces images in a direction substantially perpendicular to an optical axis by having a component of it's displacement perpendicular to the opti cal axis, and in which the zoom lens satisfies the following conditions:

$$0.2 < f2/f2A < 0.6$$

$$0.4 < LP/fw < 1.0,$$

where f2A and f2 are the focal lengths of the second A lens component and the second lens group, respectively; LP is the distance along the optical axis between the lens surface closest to the image side of the second A lens component and the aperture stop; and fw is the focal length of the entire system at the wide angle end.

Further features of the present invention will become apparent from the following description of exemplary embodiments with reference to the attached drawings.

BRIEF DESCRIPTION OF THE DRAWINGS

FIG. 4 is a lens sectional view at the wide angle end of exemplary embodiment 2 according to the present invention.

FIG. 7 is a lens sectional view at the wide angle end of exemplary embodiment 3 according to the present invention.

FIGS. 8A and 8B are longitudinal aberration drawings at the wide angle end and at the telephoto end, respectively, of exemplary embodiment 3 according to the present invention.

FIG. 10 is a lens sectional view at the wide angle end of exemplary embodiment 4 according to the present invention.

FIGS. 11A and 11B are longitudinal aberration drawings at the wide angle end and at the telephoto end, respectively, of exemplary embodiment 4 according to the present invention.

FIGS. 14A and 14B are longitudinal aberration drawings at the wide angle end and at the telephoto end, respectively, of exemplary embodiment 5 according to the present invention.

DESCRIPTION OF THE EMBODIMENTS

Figure 1:
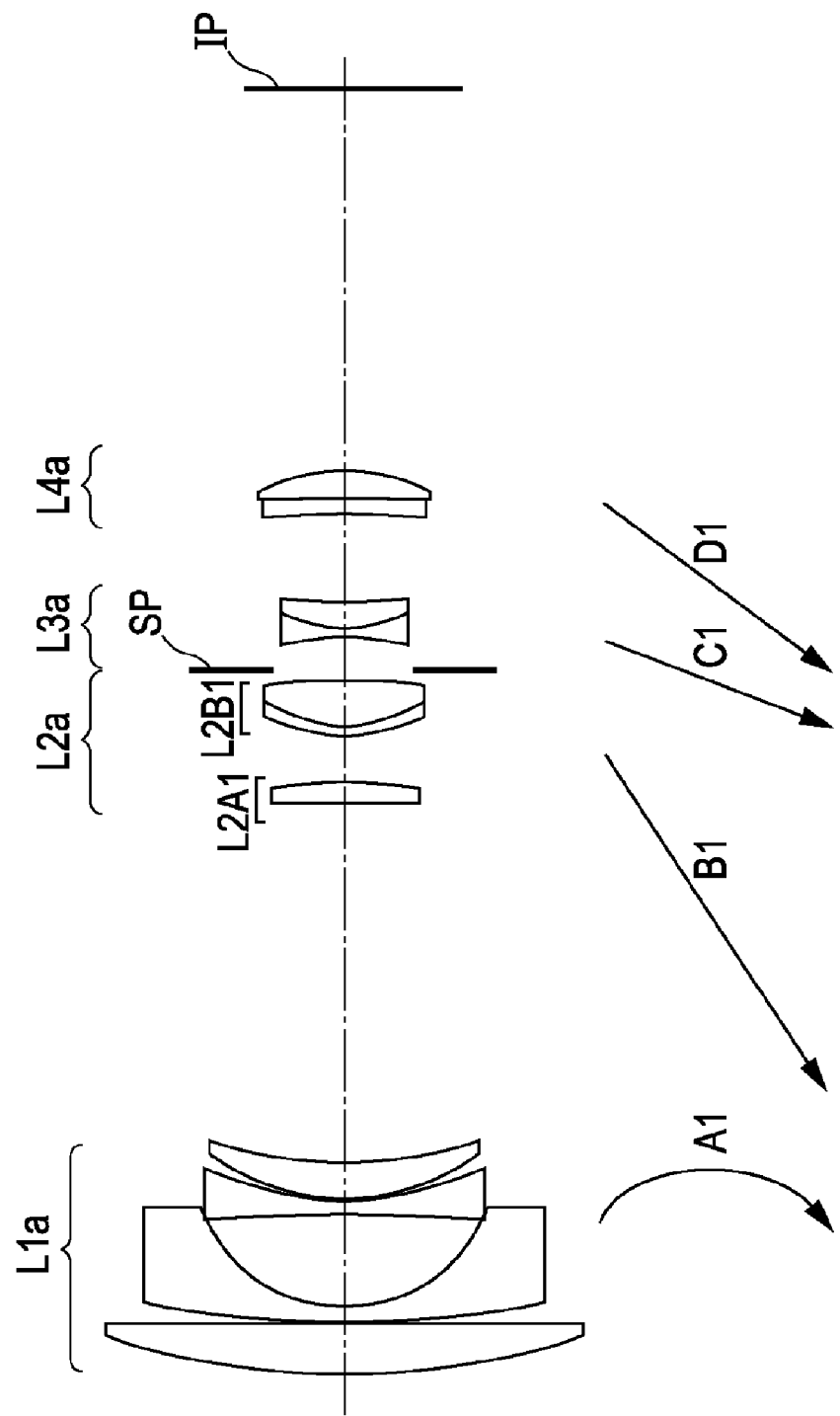
FIG. 1 is a lens sectional view at a wide angle end of exemplary embodiment 1 according to the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the focal lengths, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Embodiments of a zoom lens and an image-pickup apparatus having the zoom lens according to the present invention will be described below.

Figure 2A:
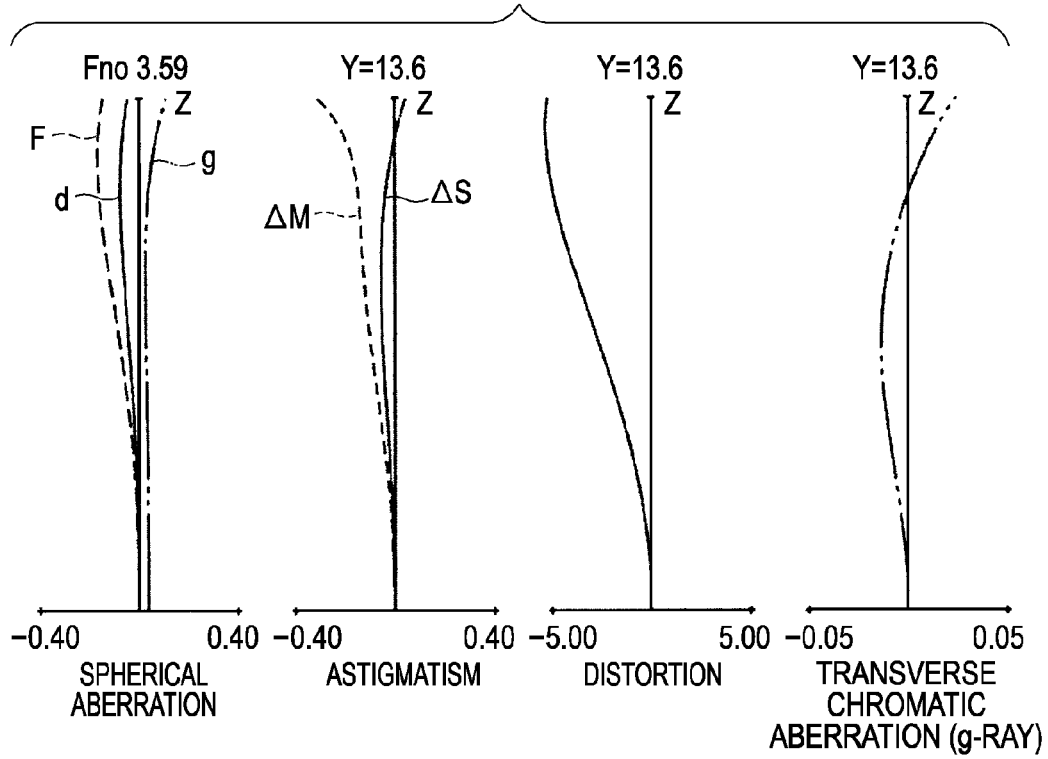
FIGS. 2A and 2B are longitudinal aberration drawings at the wide angle end and at a telephoto end, respectively, of exemplary embodiment 1 according to the present invention.
Figure 2B:
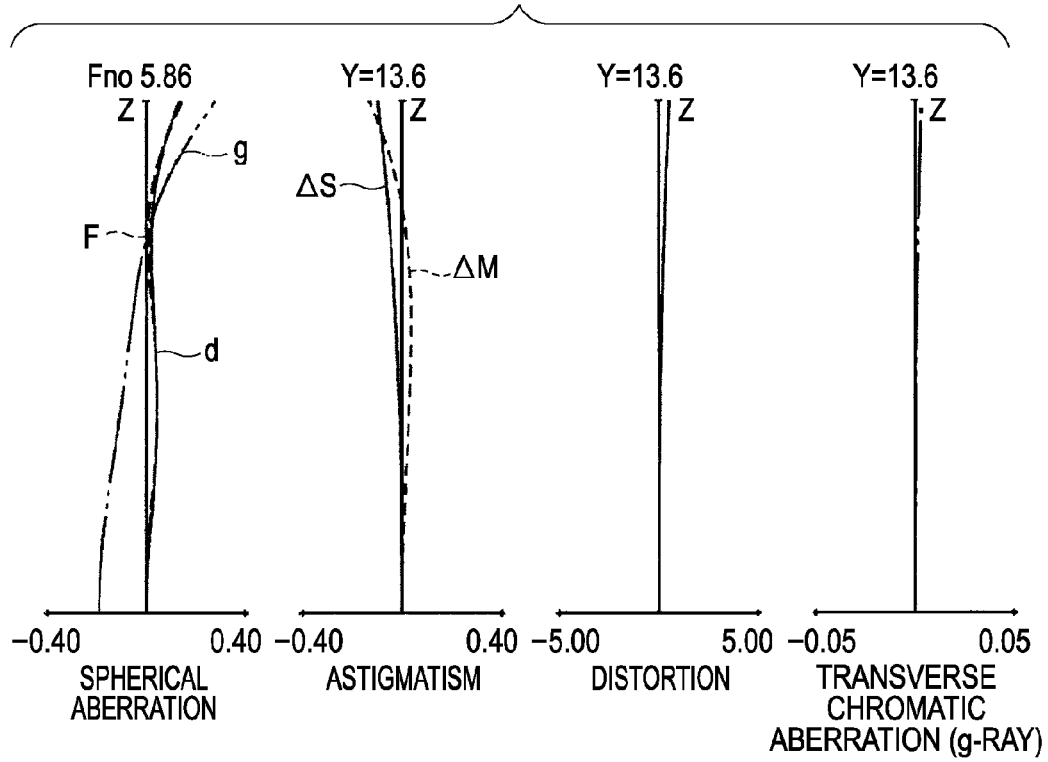

FIG. 1 is a lens sectional view of a zoom lens of an exemplary embodiment 1 at a wide angle end (short focal length end), and FIGS. 2A and 2B are longitudinal aberration drawings of the zoom lens of the exemplary embodiment 1 at the wide angle end and at a telephoto end (long focal length end), respectively.

Figure 3A:
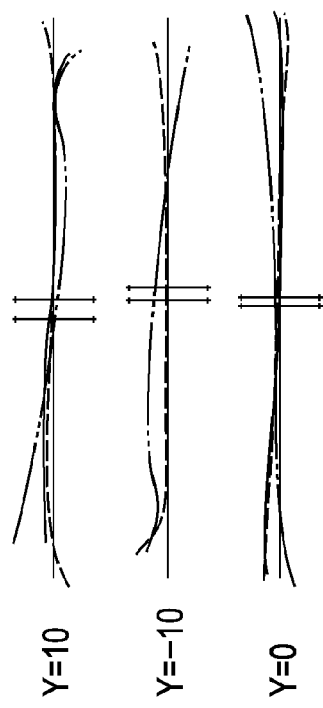
FIGS. 3A to 3D are lateral aberration drawings at wide angle and telephoto ends and for base and image stabilization periods, respectively, of exemplary embodiment 1 according to the present invention.
Figure 3B:
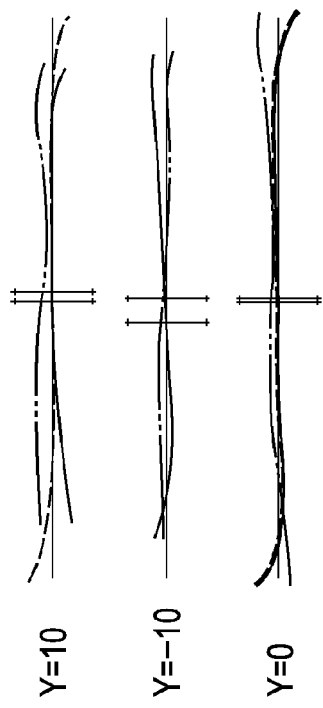

FIGS. 3A and 3B are lateral aberration drawings of the zoom lens of the exemplary embodiment 1 at the wide angle end and at the telephoto end, respectively, for a base period (without image stabilization).

Figure 3C:
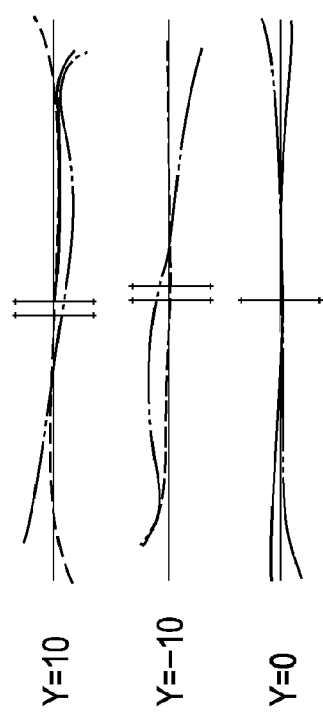
Figure 3D:
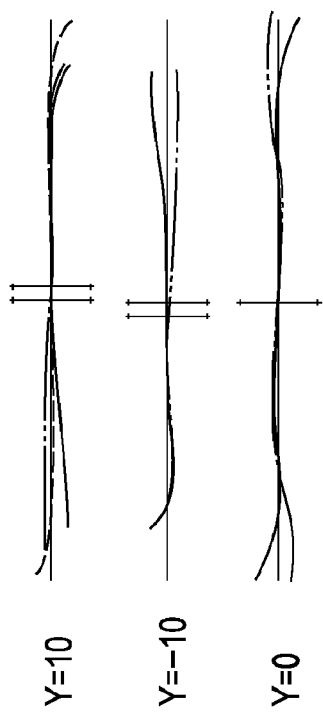

FIGS. 3C and 3D are lateral aberration drawings of the zoom lens of the exemplary embodiment 1 at the wide angle end and at the telephoto end, respectively, for a image stabilization period when a deflection inclination of 0.3° is corrected.

Figure 5A:
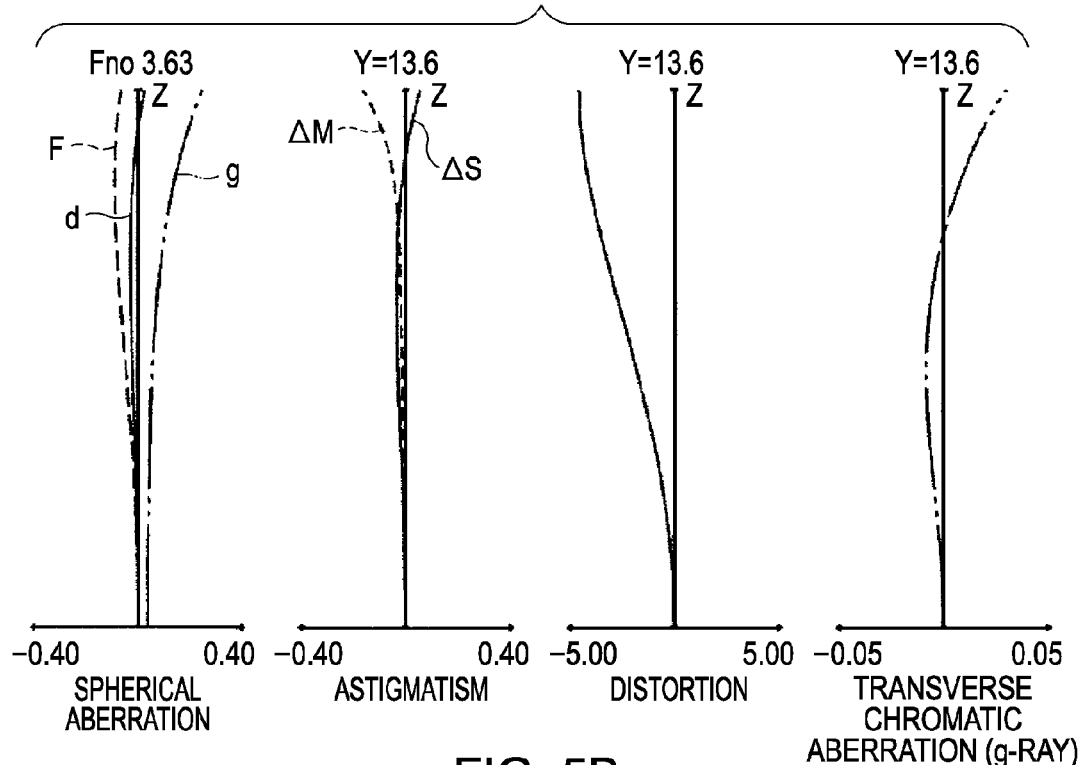
FIGS. 5A and 5B are longitudinal aberration drawings at the wide angle end and at the telephoto end, respectively, of exemplary embodiment 2 according to the present invention.
Figure 5B:
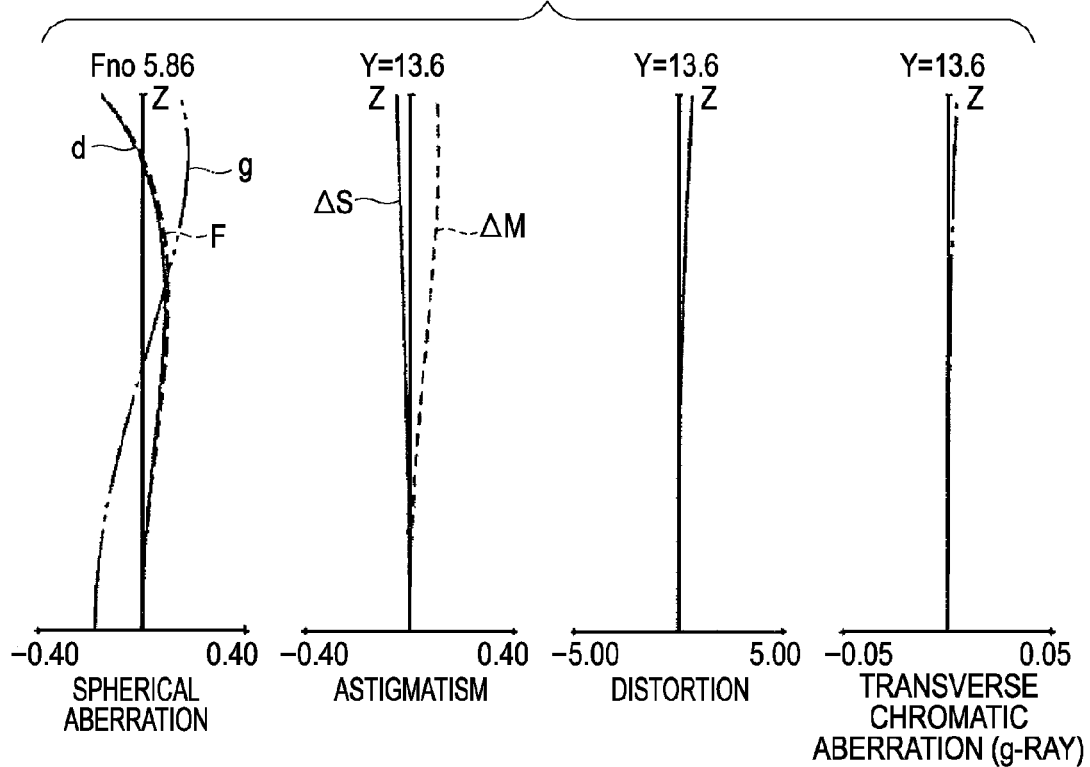

FIG. 4 is a lens sectional view of a zoom lens of an exemplary embodiment 2 according to the present invention at the wide angle end, and FIGS. 5A and 5B are longitudinal aberration drawings of the zoom lens of the exemplary embodiment 2 at the wide angle end and at the telephoto end, respectively.

Figure 6A:
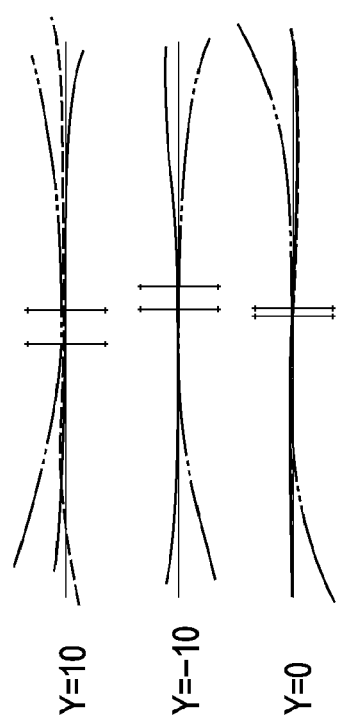
FIGS. 6A to 6D are lateral aberration drawings at wide angle and telephoto ends and for base and image stabilization periods, respectively, of exemplary embodiment 2 according to the present invention.
Figure 6C:
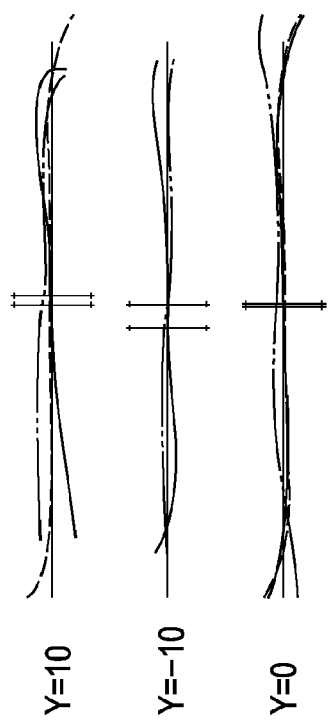
Figure 6B:
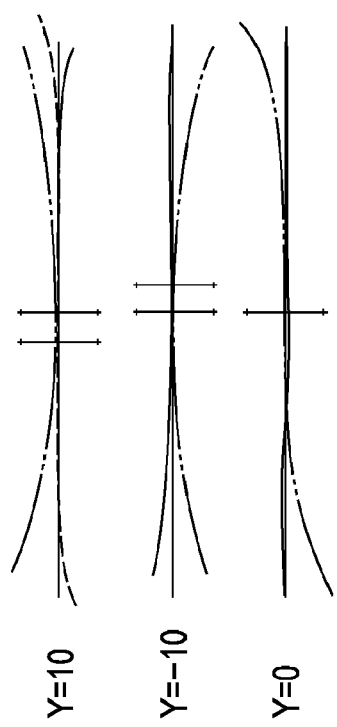

FIGS. 6A and 6B are lateral aberration drawings of the zoom lens of the exemplary embodiment 2 at the wide angle end and at the telephoto end, respectively, for the base period.

Figure 6D:
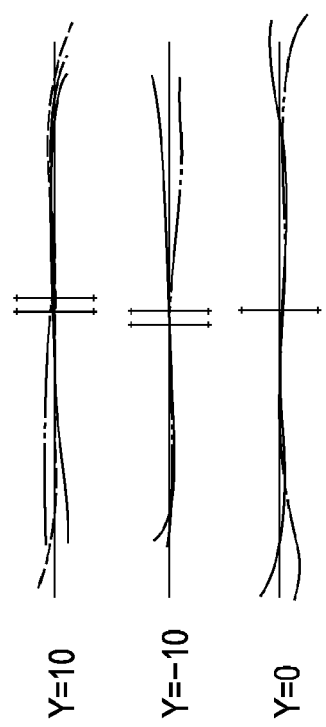

FIGS. 6C and 6D are lateral aberration drawings of the zoom lens of the exemplary embodiment 2 at the wide angle end and at the telephoto end, respectively, for the image stabilization period when a deflection inclination of 0.3° is corrected.

FIG. 7 is a lens sectional view of a zoom lens of an exemplary embodiment 3 according to the present invention at the wide angle end, and FIGS. 8A and 8B are longitudinal aberration drawings of the zoom lens of the exemplary embodiment 3 at the wide angle end and at the telephoto end, respectively.

Figure 9A:
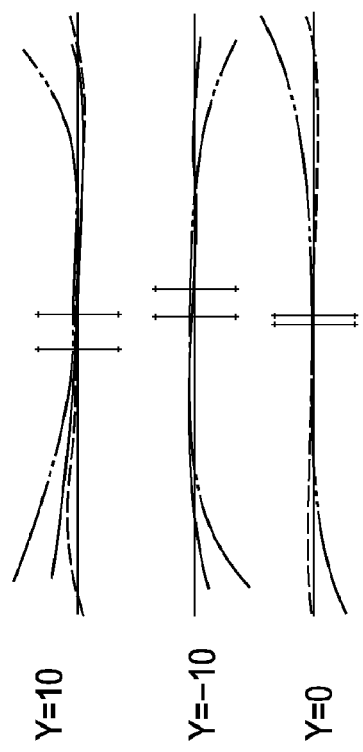
FIGS. 9A to 9D are lateral aberration drawings at wide angle and telephoto ends and for base and image stabilization periods, respectively, of exemplary embodiment 3 according to the present invention.
Figure 9C:
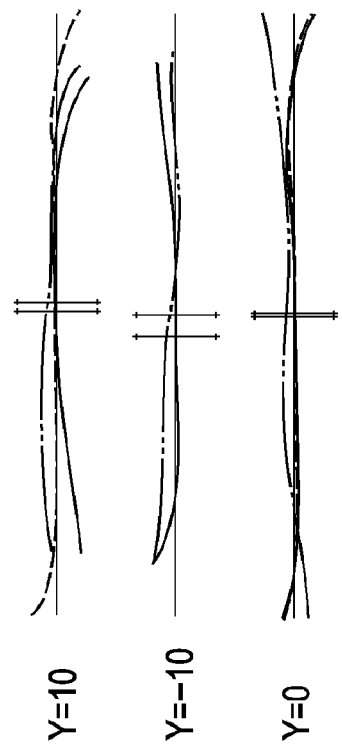
Figure 9B:
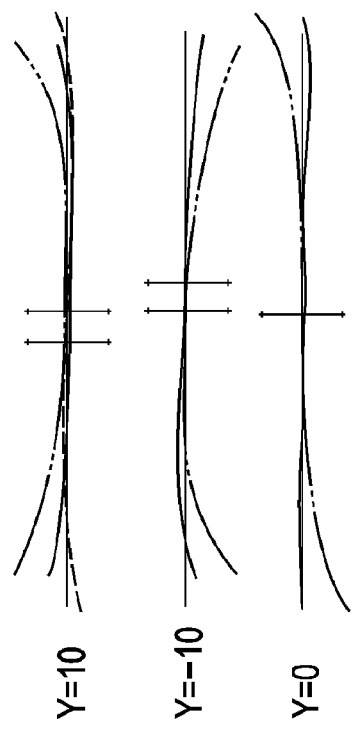
Figure 9D:
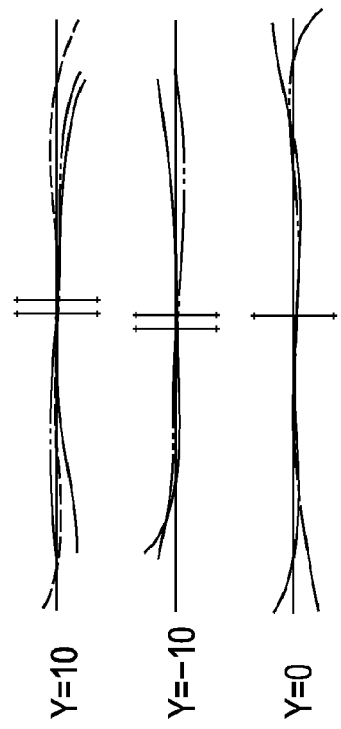

FIGS. 9A and 9B are lateral aberration drawings of the zoom lens of the exemplary embodiment 3 at the wide angle end and at the telephoto end, respectively, for the base period.

FIGS. 9C and 6D are lateral aberration drawings of the zoom lens of the exemplary embodiment 3 at the wide angle end and at the telephoto end, respectively, for the image stabilization period when a deflection inclination of 0.3° is corrected.

FIG. 10 is a lens sectional view of a zoom lens of an exemplary embodiment 4 according to the present invention at the wide angle end, and FIGS. 11A and 11B are longitudinal aberration drawings of the zoom lens of the exemplary embodiment 4 at the wide angle end and at the telephoto end, respectively.

Figure 12A:
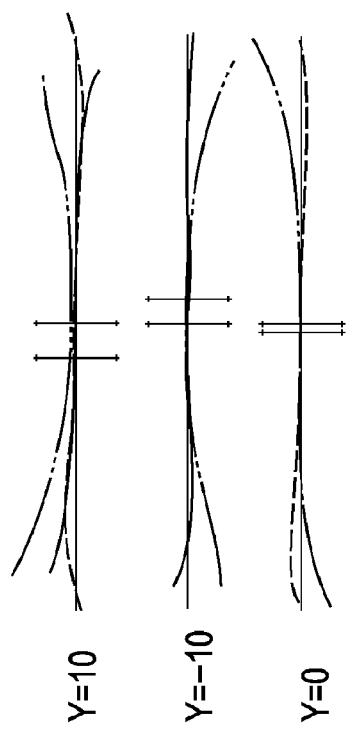
FIGS. 12A to 12D are lateral aberration drawings at wide angle and telephoto ends and for base and image stabilization periods, respectively, of exemplary embodiment 4 according to the present invention.
Figure 12B:
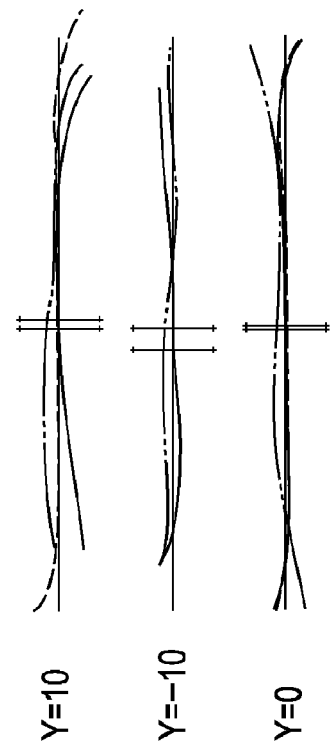

FIGS. 12A and 12B are lateral aberration drawings of the zoom lens of the exemplary embodiment 4 at the wide angle end and at the telephoto end, respectively, for the base period.

Figure 12C:
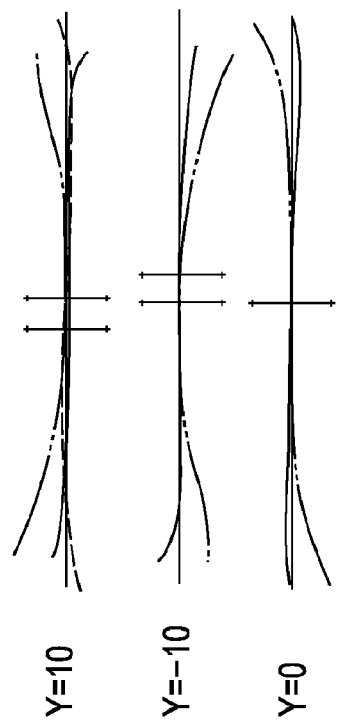
Figure 12D:
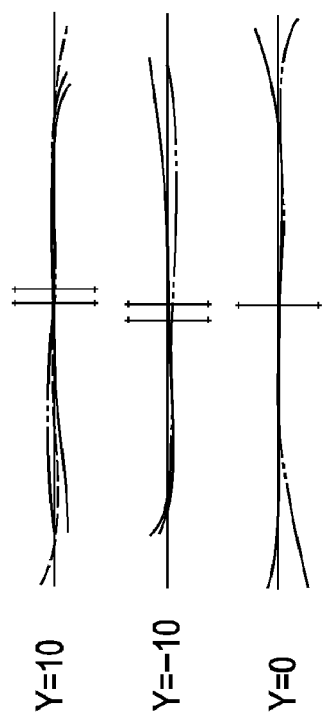

FIGS. 12C and 12D are lateral aberration drawings of the zoom lens of the exemplary embodiment 4 at the wide angle end and at the telephoto end, respectively, for the image stabilization period when a deflection inclination of 0.3° is corrected.

Figure 13:
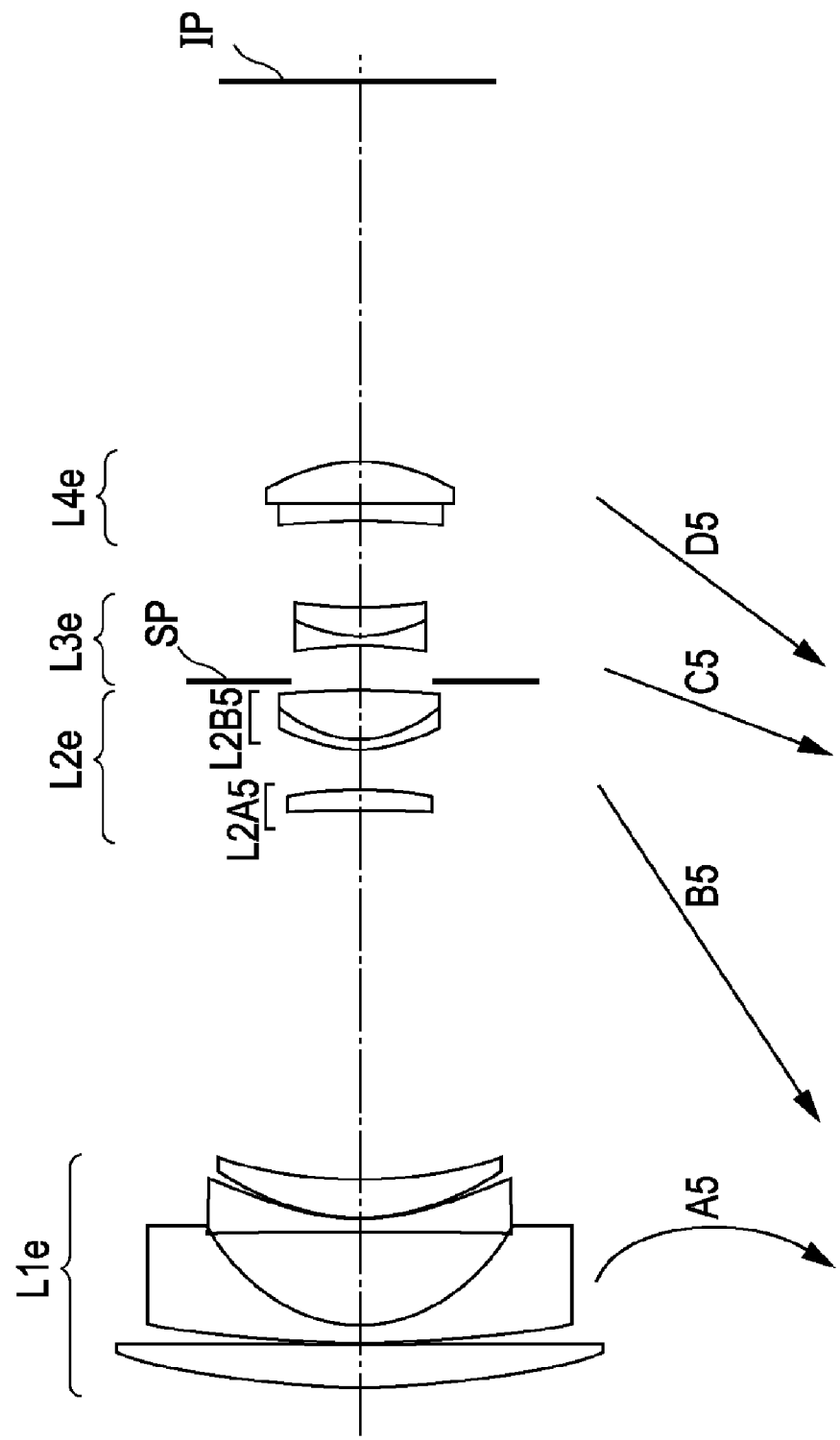
FIG. 13 is a lens sectional view at the wide angle end of exemplary embodiment 5 according to the present invention.

FIG. 13 is a lens sectional view of a zoom lens of an exemplary embodiment 5 according to the present invention at the wide angle end, and FIGS. 14A and 14B are longitudinal aberration drawings of the zoom lens of the exemplary embodiment 5 at the wide angle end and at the telephoto end, respectively.

Figure 15A:
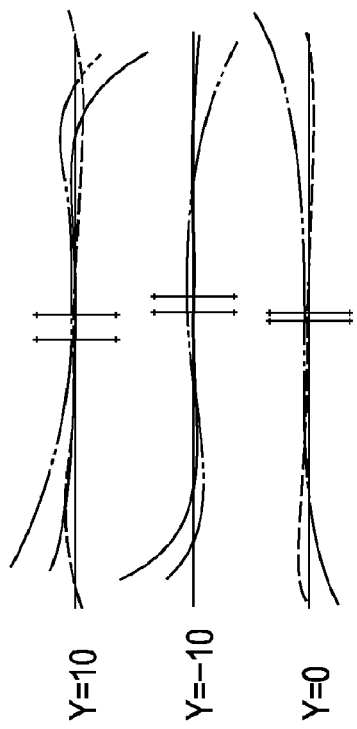
FIGS. 15A to 15D are lateral aberration drawings at wide angle and telephoto ends and for base and image stabilization periods, respectively, of exemplary embodiment according to the present invention.
Figure 15C:
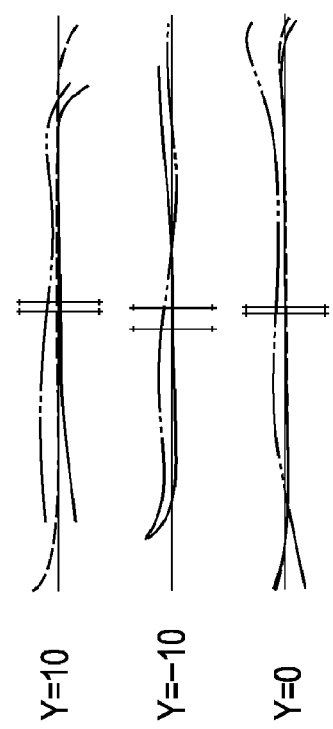
Figure 15B:
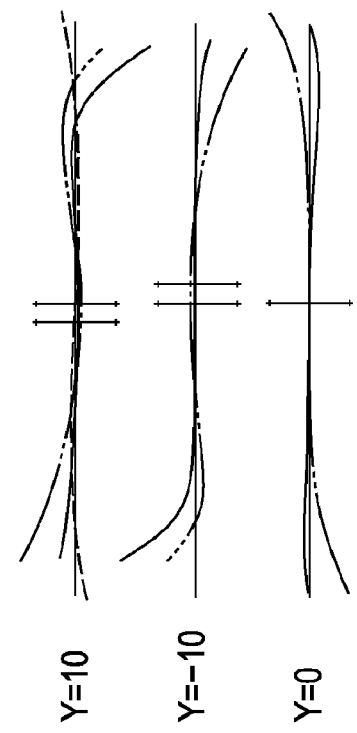

FIGS. 15A and 15B are lateral aberration drawings of the zoom lens of the exemplary embodiment 5 at the wide angle end and at the telephoto end, respectively, for the base period.

Figure 15D:
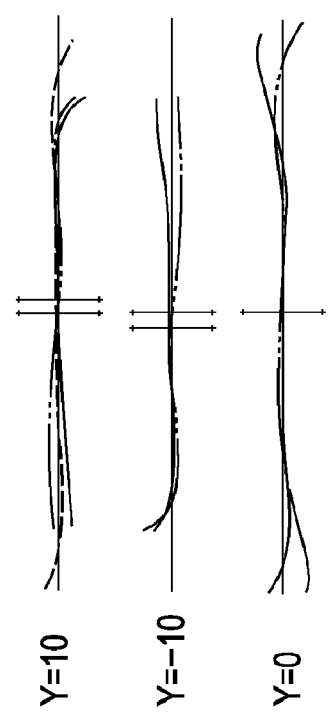

FIGS. 15C and 15D are lateral aberration drawings of the zoom lens of the exemplary embodiment 5 at the wide angle end and at the telephoto end, respectively, for the image stabilization period when a deflection inclination of 0.3° is corrected.

Figure 16:
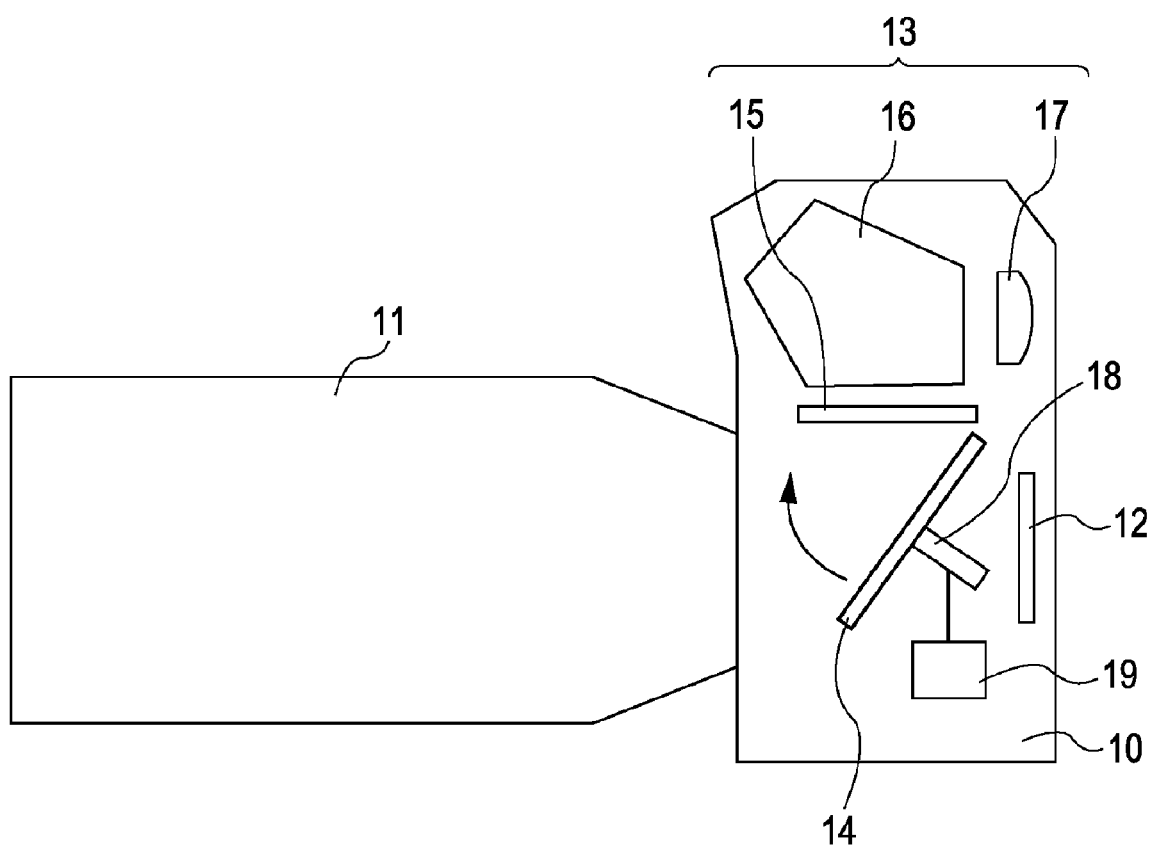
FIG. 16 is a schematic view of part of an image-pickup apparatus according to an exemplary embodiment the present invention.

FIG. 16 is a schematic view of part of a digital camera (image-pickup apparatus) according to the present invention.

The zoom lens of each of the exemplary embodiments is a taking lens system for use in the image-pickup apparatus.

In the lens sectional views shown in FIGS. 1, 4, 7, 10, and 13, the left is the object side (expansion side) and the right is an image side (contraction side).

A first lens group L1$a$-$e$ has negative refractive power (optical power=inverse number of focal length); a second lens group L2$a$-$e$ has positive refractive power; a third lens group L3$a$-$e$ has negative refractive power; and a fourth lens group L4$a$-$e$ has positive refractive power.

A second A lens component L2A1-5 with positive refractive power constitutes the second lens group L2$a$-$e$. A second B lens component L2B1-5 with positive refractive power constitutes the second lens group L2$a$-$e$.

The lens component means a lens system composed of a single and a plurality of lenses. An aperture stop SP is located adjacent to the image of the second lens group L2$a$-$e$ for adjusting a light amount.

An image plane IP corresponds to an image-pickup surface of a solid state image device (photoelectric transducer), such as a CCD sensor and a CMOS sensor, when used for a photographic optical system of a video camera and a digital still camera, and it corresponds to a film surface when used for a silver film camera.

In the aberration drawings, reference characters d, g, and F denote a d-ray, a g-ray, and an F-ray, respectively; characters ΔM and ΔS denote a meridional image plane of the d-ray and a sagittal image plane of the d-ray, respectively; the transverse chromatic aberration is represented by the g-ray; character Fno denotes a F number; and character Y denotes an image height. The Z-axis in the spherical aberration's graph is entrance pupil radius, the Z-axis in the astigmatism's, distortion's and chromatic aberration of magnification's graphs is image height.

In the following exemplary embodiments, the wide angle end and the telephoto end are designated by both-end zooming positions in the mechanically movable range along the optical axis of a lens group with variable power (second, third, and fourth lens groups L2$a$-$e$, L3$a$-$e$, and L4$a$-$e$ in respective examples).

In each exemplary embodiment, during zooming from the wide angle end to the telephoto end, each lens group moves in arrow direction in the lens sectional views.

In each exemplary embodiment, each lens group moves so that the space between the first lens group L1$a$-$e$ and the second lens group L2$a$-$e$ is smaller, the space between the second lens group L2$a$-$e$ and the third lens group L3$a$-$e$ is larger, and the space between the third lens group L3$a$-$e$ and the fourth lens group L4$a$-$e$ is smaller at the telephoto end than those at the wide angle end.

Specifically, during the zooming from the wide angle end to the telephoto end, the first lens group L1$a$-$e$ moves (A1-A5) along part of a trajectory being convex toward the image.

Any of the second to fourth lens groups L2$a$-$e$ to L4$a$-$e$ moves (B1-B5; C1-C5; and D1-D5) toward the object.

The second lens group L2$a$-$e$ and the fourth lens group L4$a$-$e$ can be moved (B1-B5; and D1-D5) independently or integrally for simplifying the mechanism.

The aperture stop SP moves together with the second lens group L2$a$-$e$ during the zooming.

The focusing can be performed by moving the first lens group L1$a$-$e$.

In each exemplary embodiment, during zooming from the wide angle end to the telephoto end, the fourth lens group L4$a$-$e$ located closest to the image can be moved (D1-D5) toward the object.

Hence, in each exemplary embodiment, the back focus at the wide angle end is shortest.

Then, the refractive power is arranged so that the principal point adjacent to the image is located closer to the image so as to increase the back focus at the wide-angle end zooming position.

That is, the entire lens system is constructed to become more like a retrofocus type at the wide-angle end zooming position. Specifically, in order to arrange lens groups to have the negative and positive refractive power from the object to the image in that order, at the wide-angle end zooming position, the second to fourth lens groups L2$a$-$e$ to L4$a$-$e$ having positive resultant refractive power are arranged apart from the first lens group L1$a$-e with negative refractive power.

In the resultant refractive power of the second to fourth lens groups L2$a$-$e$ to L4$a$-$e$, the third lens group L3$a$-$e$ with negative refractive power is also arranged closer to the image so that the principal point adjacent to the image is located closer to the image so as to sufficiently increase the back focus in the entire system.

On the other hand, at the telephoto end zooming position, in order to reduce the full length of the entire lens system, the lens groups can be arranged to have the positive and negative refractive power from the object to the image in that order so that the entire lens system is constructed to become more like a telephoto type and the principal point adjacent to the image is located closer to the object.

Specifically, at the telephoto end zooming position, the first lens group L1a-e with negative refractive power is moved (A1-A5) closer to the second lens group L2a-e with positive refractive power for forming a lens group having resultant positive refractive power.

Also, the third lens group L3a-e is moved (C1-C5) closer to the fourth lens group L4a-e for forming a lens group having resultant negative refractive power. Thereby, the full length of the entire lens system is reduced at the telephoto end by forming the telephoto type.

The second lens group L2a-e is composed of the second A lens component L2A1-5 constituted by only a positive single lenses, and the second B lens component L2B1-5 having a negative lens and a positive lens. The vibration is compensated by displacing the images formed by the zoom lens in a direction substantially perpendicular to the optical axis and moving (displacing) the second A lens component L2A so as to have a component perpendicular to the optical axis. By constructing the second A lens component L2A1-5 with one single lens, the weight of the zoom lens is reduced, and the image stabilization mechanism and the lens frame configured to hold the second A lens component L2A1-5 are reduced in size.

In particular, the load to a camera shake drive system for correcting blur is reduced, thereby miniaturizing the camera shake drive system and improving the response to the decentering.

However, when the vibration is compensated with one single lens, it can be necessary that the refractive power of the image stabilizing lens (the second A lens component L2A1-5) be suitably established and the second B lens component L2B1-5 be suitably constituted of lenses. For maintaining the optical performances during compensating the vibration, the refractive power of the single lens may be rather weak; however, the image stabilizing sensitivity can be reduced by doing so. As a result, the displacement during the image stabilization is unfavorably increased. Then, as will be described later, the refractive power of the second A lens component L2A1-5 is suitably established by satisfying a conditional equation (1).

For correcting chromatic aberration over the entire zooming range, the second lens group L2a-e can be corrected in chromatic aberration to some extent. Thus, the second B lens component L2B1-5 can be constructed so as to have at least one negative lens and one positive lens so as to suppress the change in chromatic aberration during the zooming.

In each exemplary embodiment, the zoom lens includes the first lens group L1a-e with negative refractive power, the second lens group L2a-e with positive refractive power, the aperture stop SP, and trailing lens groups arranged from the object to the image in that order. Then, by changing the space between the first lens group L1a-e and the second lens group L2a-e, the zooming is performed. The above is fundamental construction of the zoom lens according to at least one exemplary embodiment of the present invention.

At this time, a conditional equation (2) can be satisfied in addition to the conditional equation (1). By satisfying the conditional equation (2), the distance between the mechanism of the aperture stop SP and the camera shake drive system can be maintained to some extent, so that they can be efficiently arranged without physical intervention, facilitating the entire system to be miniaturized.

During the zooming, the image stabilizing mechanism including the second A lens component L2A1-5 is moved (B1-B5) integrally with the second lens group L2a-e. The aperture stop mechanism is also moved integrally with the second lens group L2a-e so as to simplify the mechanism.

In each exemplary embodiment, the second A lens component L2A1-5, which constitutes part of the zoom lens, and has comparatively small size and weight and suitably established refractive power, is moved so as to have a component substantially perpendicular to the optical axis, so that the image blur when the zoom lens is vibrated (tilted) is corrected. Thereby, the image blur is effectively corrected while the entire apparatus is miniaturized and simplified in mechanism, and the load of the driving means is reduced.

In each exemplary embodiment, by constructing the second A lens component L2A1-5 for displacing an imaging position (images) in such a manner, excellent image stabilizing sensitivity is ensured.

In each exemplary embodiment, at least one of following equations is satisfied so as to have an effect corresponding to the equation.

$$0.2 < f2/f2A < 0.6 \quad (1)$$

$$0.4 < LP/fw < 1.0 \quad (2)$$

$$0.05 < d2A/fw < 0.2 \quad (3)$$

$$55 < V2A < 85 \quad (4)$$

$$0.4 < (Vp - Vn)/V2A < 0.7 \quad (5)$$

$$2.4 < ft/fw < 4.0 \quad (6)$$

$$0.30 < fw/bfw < 0.70 \quad (7)$$

$$0.15 < d23w/fw < 0.40 \quad (8)$$

$$1.5 < fw/f4 < 2.6 \quad (9),$$

where f2A and f2 are focal lengths of the second A lens component L2A1-5 and the second lens group L2a-e, respectively; LP is the distance between the lens surface closest to the image of the second A lens component L2A1-5 and the aperture stop SP along the optical axis; fw and ft are focal lengths of the entire system at the wide angle end and at the telephoto end, respectively; d2A is the length of the positive lens of the second A lens component L2A1-5 in the optical axial direction; V2A is the Abbe number of the positive lens material of the second A lens component L2A1-5; Vn and Vp are the Abbe numbers of the materials of the negative lens and the positive lens of the second B lens component L2B1-5; bfw is the back focus at the wide angle end; d23w is the axial air space at the wide angle end between the second lens group L2a-e and the third lens group L3a-e; and f4 is the focal length of the fourth lens group L4a-e.

Then, the technical meaning of each conditional equation will be described.

The conditional equation (1) relates to the refractive power ratio between the second A lens component L2A1-5 and the second lens group L2a-e, and it is especially for balancing the optical performance and the image stabilizing sensitivity during compensating vibration.

When the refractive power of the second A lens component L2A1-5 is reduced less than the lower limit of the conditional equation (1), the image stabilizing sensitivity is lowered. Consequently, the displacement of the second A lens component L2A1-5 during compensating vibration is excessively increased, so that the drive control of the second A lens component L2A1-5 becomes difficult, unfavorably increasing the image stabilizing drive system in size.

When the refractive power of the second A lens component L2A1-5 is excessively increased over the upper limit, since the second A lens component L2A1-5 is composed of only one positive lens, correction of the coma and transverse chromatic aberration during compensating vibration is difficult.

The conditional equation (2) relates to the ratio between the distance between the lens surface closest to the image of the second A lens component L2A1-5 and the aperture stop SP along the optical axis and the focal length of the entire system at the wide angle end. The conditional equation (2) is principally for miniaturizing the system by optimizing the arrangement of the second A lens component L2A1-5 and the mechanism of the aperture stop SP.

When the ratio is reduced less than the lower limit of the conditional equation (2), the second A lens component L2A1-5 excessively approaches the mechanism of the aperture stop SP, so that they can unfavorably intervene physically with each other.

When the ratio is excessively increased over the upper limit of the conditional equation (2), the second A lens component L2A1-5 can be excessively separated from the mechanism of the aperture stop SP, so that the system can be difficult to be miniaturized by effectively using the space.

The conditional equation (3) relates to the ratio between the wall thickness (center thickness) of the second A lens component L2A1-5 composed of one positive lens, and the focal length of the entire system at the wide angle end, and it can be used for obtaining the reduction in weight and high optical performances of the second A lens component L2A1-5.

When the ratio is reduced less than the lower limit of the conditional equation (3), the thickness of the positive single lens is excessively reduced, so that the lens can be difficult to fabricate and to establish the optimum lens shape for correcting the spherical aberration.

When the ratio is excessively increased over the upper limit of the conditional equation (3), the thickness of the positive single lens is excessively increased, unfavorably increasing the lens in weight and full length at the wide angle end.

The conditional equation (4) defines the Abbe number of the positive single lens material of the second A lens component L2A1-5, and in particular it can be used for correcting axial chromatic aberration at the wide angle end during compensating vibration while suppressing the changes in transverse chromatic aberration during zooming when the vibration is not compensated.

Since the second A lens component L2A1-5 is composed of a single positive lens for image stabilization, the transverse chromatic aberration tends to be generated during compensating vibration, so that the material can be suitably selected. When the Abbe number is reduced less than the lower limit of the conditional equation (4), the transverse chromatic aberration is unfavorably deteriorated during compensating vibration. When the Abbe number is increased over the upper limit of the conditional equation (4), the axial chromatic aberration is insufficiently corrected especially at the wide angle end, unfavorably increasing the axial chromatic aberration to the over side.

The conditional equation (5) defines the Abbe number relationship between the positive single lens material of the second A lens component L2A1-5 and the materials of negative/positive lenses of the second B lens component L2B1-5, and it can be used for favorably correcting the axial chromatic aberration.

It is generally useful that the aberration be corrected to some extent in each lens group itself of the zoom lens.

In each exemplary embodiment, since the second A lens component L2A1-5 is composed of a single positive lens, the chromatic aberration is corrected with the second B lens component L2B1-5 while being corrected with the entire second lens group L2a-e. When the relationship is reduced less than the lower limit of the conditional equation (5), the axial chromatic aberration is insufficiently corrected especially at the telephoto end, unfavorably increasing the axial chromatic aberration to the under side. When the relationship is increased over the upper limit of the conditional equation (5), the axial chromatic aberration is insufficiently corrected especially at the wide angle end, unfavorably increasing the axial chromatic aberration to the over side.

The conditional equation (6) relates to the focal length ratio between the entire system at the wide angle end and the entire system at the telephoto end. When the ratio is reduced less than the lower limit of the conditional equation (6), the sufficient zooming ratio may not be obtained. When the ratio is increased over the upper limit of the conditional equation (6), the zooming ratio is excessively increased, unfavorably increasing the entire length of the lens.

The conditional equation (7) relates to the focal length ratio between the back focus at the wide angle end and the entire system at the wide angle end. This establishes an optimum condition for an image-pickup apparatus requiring a long back focus, such as a single lens reflex camera. The back focus herein signifies the distance between the paraxial image plane and the lens surface adjacent to the image of the lens located closest to the image among lenses (optical elements) having a curvature (power).

When the ratio is reduced less than the lower limit of the conditional equation (7), the back focus at the wide angle end is excessively increased, thereby increasing the lens full length at the wide angle end. The lens becomes more like a retrofocus type excessively, so that the distortion especially at the wide angle end is difficult to correct.

When the ratio is increased over the upper limit of the conditional equation (7), the back focus is excessively reduced, so that the lens tends to intervene with a mirror and the exit pupil unfavorably comes close to the image plane.

The conditional equation (8) defines the axial air space at the wide angle end between the lens surface closest to the image of the second lens group L2a-e and the lens surface closest to the object of the third lens group L3a-e. When the space is reduced less than the lower limit of the conditional equation (8), the second A lens component L2A1-5 is located rather adjacent to the image plane, so that the image stabilizing mechanism is difficult to arrange. When the space is increased over the upper limit of the conditional equation (8), the refractive power of retrofocus type becomes weak especially at wide angle end, so that the back focus is difficult to be elongated.

The conditional equation (9) relates to the focal length ratio between the fourth lens group L4a-e and the entire system at the wide angle end, and it can be used for ensuring high optical performances and the long back focus at the wide angle end. When the ratio is reduced less than the lower limit of the conditional equation (9), the refractive power of the fourth lens group L4a-e is excessively weaken, so that the back focus is unfavorably reduced especially at the wide angle end. When the ratio is increased over the upper limit of the conditional equation (9), the refractive power of the fourth lens group L4a-e is excessively increased, so that the curvature of field is difficult to correct especially at the wide angle end.

Additionally, the numerical ranges of the conditional equations (1) to (9) are set as follows:

$$0.25 < f2/f2A < 0.38 \quad (1a)$$

$$0.45 < LP/fw < 0.7 \quad (2a)$$

$$0.07 < d2A/fw < 0.15 \quad (3a)$$

$$55 < V2A < 75 \quad (4a)$$

$$0.5 < (Vp-Vn)/V2A < 0.65 \quad (5a)$$

$$2.5 < ft/fw < 3.5 \quad (6a)$$

$$0.40 < fw/bfw < 0.60 \quad (7a)$$

$$0.20 < d23w/fw < 0.30 \quad (8a)$$

$$2.0 < fw/f4 < 2.4 \quad (9a).$$

In each exemplary embodiment, by such a structure described above, a zoom lens having a zooming ratio of about 2.5 or more and a back focus longer than its focal length can be obtained. Furthermore, by moving a comparatively small and light weight single lens so as to have a component substantially perpendicular to the optical axis, the image blur when the zoom lens is vibrated (tilted) is corrected. Thereby, a zoom lens is obtained which is capable of effectively correcting the image blur while the entire apparatus is miniaturized and simplified in mechanism and the load of the driving means is reduced.

Numerical examples 1 to 5 respectively corresponding to the exemplary embodiments 1 to 5 will be shown below. In each numerical example, reference character i denotes a face order from the object side; character Ri a radius of curvature of each face; character Di a member wall thickness or an air space between the $i^{th}$ face and the $(i+1)^{th}$ face; and characters Ni and νi denote a refractive index and an Abbe number of the d-ray, respectively. Also, "$e^{-X}$" signifies "$\times 10^{-X}$" Character f denotes a focal length; character Fno an F number; and character ω a half angle of view. The aspheric shape is expressed by Numerical Formula 1:

$$X = \frac{(1/R)H^2}{1 + \sqrt{1-(H/R)^2}} + AH^2 + BH^4 + CH^6 + DH^8 + EH^{10} + FH^{12}$$

Numerical Formula 1 where X is the displacement in the optical axial direction from the surface apex as a reference at the height h from the optical axis; R is the paraxial radius of curvature; and A, B, C, D, E, and F are aspheric factors.

The relationship between the conditional equations described above and numerals of the numerical examples will be shown in Table 1.

NUMERICAL EXAMPLES 1 f=17.50~53.00 Fno=3.59~5.86 2ω=75.8°~28.8°

R 1=74.641 D 1=4.50 N 1=1.516330 ν 1=64.1

R 2=−3856.041 D 2=0.15

R 3=98.417 D 3=1.60 N 2=1.622992 ν 2=58.2

R 4=14.489 D 4=8.52

R 5=−127.608 D 5=1.20 N 3=1.622992 ν 3=58.2

R 6=27.528 D 6=0.15

R 7=21.526 D 7=3.40 N 4=1.846660 ν 4=23.8

R 8=42.071 D 8=VARIABLE

R 9=−531.961 D 9=1.70 N 5=1.518229 ν 5=58.9

R10=−36.156 D10=4.53

R11=16.829 D11=0.80 N 6=1.846660 ν 6=23.9

R12=12.056 D12=4.20 N 7=1.487490 ν 7=70.2

R13=−71.553 D13=1.00

R14=APERTURE STOP D14=VARIABLE

R15=−28.778 D15=0.75 N 8=1.647689 ν 8=33.8

R16=12.243 D16=2.40 N 9=1.761821 ν 9=26.5

R17=51.593 D17=VARIABLE

R18=−62.665 D18=1.30 N10=1.491710 ν10=57.4
R19=−140.261 D19=−0.07

R20=1237.920 D20=2.69 N11=1.487490 ν11=70.2

R21=−17.585

\FOCAL LENGTH 17.50 31.07 53.00 VARIABLE SPACE\

D 8 33.74 13.03 3.04

D14 3.30 6.68 10.13

D17 8.24 4.86 1.41

NUMERICAL EXAMPLES 2 f=18.69~53.27 Fno=3.63~5.86 2ω=72.2°~28.7°

R 1=80.198 D 1=3.40 N 1=1.516330 ν 1=64.1

R 2=1485.520 D 2=0.15

R 3=74.916 D 3=1.60 N 2=1.622992 ν 2=58.2

R 4=14.601 D 4=7.99

R 5=−141.698 D 5=1.20 N 3=1.622992 ν 3=58.2

R 6=25.795 D 6=0.15

R 7=21.179 D 7=3.40 N 4=1.805181 ν 4=25.4

R 8=46.880 D 8=VARIABLE

R 9=−302.692 D 9=1.90 N 5=1.487490 ν 5=70.2

R10=−34.091 D10=4.20

R11=16.673 D11=0.80 N 6=1.846660 ν 6=23.9

R12=12.277 D12=4.50 N 7=1.487490 ν 7=70.2

R13=−73.294 D13=1.00

R14=APERTURE STOP D14=VARIABLE

R15=−29.161 D15=0.75 N 8=1.639799 ν 8=34.5

R16=12.672 D16=2.60 N 9=1.784723 ν 9=25.7

R17=43.512 D17=VARIABLE

R18=−96.235 D18=1.50 N10=1.583060 ν10=30.2
R19=−437.245 D19=0.03

R20=417.340 D20=3.80 N11=1.487490 ν11=70.2

R21=−18.474

\FOCAL LENGTH 18.69 32.08 53.27 VARIABLE SPACE\

D 8 33.62 13.53 3.23

D14 3.30 6.19 8.96

D17 7.34 4.45 1.68

ASPHERIC FACTOR

19 FACE: A=0.00000e+00 B=3.76648e−05 C=3.00374e−08 D=7.60709e−10 E=−8.99719e−12 F=0.00000e+00

NUMERICAL EXAMPLES 3 f=18.62~53.32 Fno=3.63~5.86 2ω=72.4°~28.7°

R 1=70.299 D 1=3.40 N 1=1.516330 ν 1=64.1

R 2=601.574 D 2=0.15

R 3=85.189 D 3=1.60 N 2=1.622992 ν 2=58.2

R 4=14.573 D 4=8.08

R 5=−131.403 D 5=1.20 N 3=1.622992 ν 3=58.2

R 6=26.414 D 6=0.15

R 7=21.357 D 7=3.40 N 4=1.805181 ν 4=25.4

R 8=48.045 D 8=VARIABLE

R 9=−212.350 D 9=1.90 N 5=1.516330 ν 5=64.1

R10=−33.748 D10=4.20

R11=16.638 D11=0.80 N 6=1.846660 ν 6=23.9

R12=12.089 D12=4.50 N 7=1.487490 ν 7=70.2

R13=−67.351 D13=1.00

R14=APERTURE STOP D14=VARIABLE

R15=−27.965 D15=0.75 N 8=1.639799 ν 8=34.5

R16=12.432 D16=2.60 N 9=1.784723 ν 9=25.7

R17=43.001 D17=VARIABLE

R18=−97.655 D18=1.50 N10=1.583060 ν 10=30.2
 R19=−332.527 D19=0.04

R20=1043.264 D20=3.76 N11=1.487490 V11=70.2

R21=−17.869

\FOCAL LENGTH 18.62 31.88 53.32 VARIABLE SPACE\

D 8 32.81 13.04 2.78

D14 3.30 6.07 8.95

D17 7.20 4.43 1.55

ASPHERIC FACTOR

19 FACE: A=0.00000e+00 B=3.81779e−05 C=2.00413e−08 D=6.78143e−10 E=−4.60818e−12 F=0.00000e+00

NUMERICAL EXAMPLES 4 f=18.57~53.32 Fno=3.63~5.86 2ω=72.5°~28.7°

R 1=75.404 D 1=3.40 N 1=1.516330 ν 1=64.1

R 2=787.756 D 2=0.15

R 3=88.153 D 3=1.60 N 2=1.622992 ν 2=58.2

R 4=14.835 D 4=8.15

R 5=−142.888 D 5=1.20 N 3=1.622992 ν 3=58.2

R 6=26.536 D 6=0.15

R 7=21.495 D 7=3.40 N 4=1.805181 ν 4=25.4

R 8=47.829 D 8=VARIABLE

R 9=−248.450 D 9=1.90 N 5=1.518229 ν 5=58.9

R10=−35.027 D10=4.20

R11=16.774 D11=0.80 N 6=1.846660 ν 6=23.9

R12=12.152 D12=4.50 N 7=1.487490 ν 7=70.2

R13=−68.717 D13=1.00

R14=APERTURE STOP D14=VARIABLE

R15=−29.501 D15=0.75 N 8=1.647689 ν 8=33.8

R16=12.252 D16=2.60 N 9=1.784723 ν 9=25.7

R17=44.558 D17=VARIABLE

R18=−89.852 D18=1.50 N10=1.583060 ν10=30.2
 R19=−276.592 D19=0.07

R20=2759.039 D20=4.08 N11=1.487490 ν11=70.2

R21=−17.975

\FOCAL LENGTH 18.57 31.77 53.32 VARIABLE SPACE\

D 8 33.51 13.31 2.76

D14 3.30 6.13 9.21

D17 7.37 4.55 1.46

ASPHERIC FACTOR

19 FACE: A=0.00000e+00 B=3.81884e−05 C=4.42863e−08 D=7.05773e−10 E=−1.04850e−11 F=0.00000e+00

NUMERICAL EXAMPLES 5 f=17.50~53.05 Fno=3.63~5.86 2ω=75.8°~28.8°

R 1=76.749 D 1=4.00 N 1=1.518229 ν 1=58.9

R 2=5373.923 D 2=0.15

R 3=102.763 D 3=1.60 N 2=1.622992 ν 2=58.2

R 4=14.773 D 4=8.44

R 5=−137.895 D 5=1.20 N 3=1.622992 ν 3=58.2

R 6=26.312 D 6=0.15

R 7=21.399 D 7=3.40 N 4=1.805181 ν 4=25.4

R 8=47.704 D 8=VARIABLE

R 9=−273.402 D 9=1.70 N 5=1.518229 ν 5=58.9

R10=−34.874 D10=4.30

R11=16.793 D11=0.80 N 6=1.846660 ν 6=23.9

R12=12.120 D12=4.20 N 7=1.487490 ν 7=70.2

R13=−70.015 D13=1.00

R14=APERTURE STOP D14=VARIABLE

R15=−28.422 D15=0.75 N 8=1.647689 ν 8=33.8

R16=12.486 D16=2.40 N 9=1.784723 ν 9=25.7

R17=44.493 D17=VARIABLE

R18=−96.742 D18=1.50 N10=1.583060 ν10=30.2
R19=−203.231 D19=0.07

R20=954.142 D20=3.98 N11=1.487490 ν11=70.2

R21=−17.650

\FOCAL LENGTH 17.50 30.77 53.05 VARIABLE SPACE\

D 8 33.80 12.73 2.21

D14 3.30 6.21 9.72

D17 7.52 4.60 1.09

ASPHERIC FACTOR

19 FACE: A=0.00000e+00 B=3.76441e−05 C=7.06633e−08
D=6.54003e−10 E=−2.14684e−11 F=0.00000e+00

TABLE 1

| CONDITIONAL EQUATION | EXEMPLARY EMBODIMENT | | | | |
|---|---|---|---|---|---|
| | 1 | 2 | 3 | 4 | 5 |
| (1)f2/f2A | 0.34 | 0.32 | 0.33 | 0.33 | 0.33 |
| (2)Lp/fw | 0.60 | 0.56 | 0.56 | 0.57 | 0.59 |
| (3)d2A/fw | 0.10 | 0.10 | 0.10 | 0.10 | 0.10 |
| (4)V2A | 58.9 | 70.2 | 64.1 | 58.9 | 58.9 |
| (5)(Vp − Vn)/V2A | 0.62 | 0.59 | 0.60 | 0.59 | 0.60 |
| (6)ft/fw | 3.02 | 2.85 | 2.86 | 2.87 | 3.03 |
| (7)fw/bfw | 0.50 | 0.53 | 0.53 | 0.53 | 0.50 |
| (8)d23w/fw | 0.25 | 0.23 | 0.23 | 0.23 | 0.25 |
| (9)fw/f4 | 2.36 | 2.30 | 2.24 | 2.30 | 2.25 |

Next, an exemplary embodiment of a single reflex camera using the zoom lens according to the present invention will be described with reference to FIG. 16. Referring to FIG. 16, reference numeral 10 denotes a single reflex camera body; numeral 11 an interchangeable lens having the zoom lens according to at least one exemplary embodiment of the present invention mounted thereon; numeral 12 a recording device configured to record object images obtained through the interchangeable lens 11, such as a film and an imager; numeral 13 a finder optical system configured to facilitate observation of object images from the interchangeable lens 11; numeral 14 a quick return mirror configured to rotate for switching object images from the interchangeable lens 11 to be transferred to the recording device 12 or to the finder optical system 13. When observing object images through the finder, the object images focused on a focus plate 15 via the quick return mirror 14 can be observed by enlarging them with an eyepiece optical system 17 after making them erect images with a penta prism 16. During shooting, the quick return mirror 14 is rotated in arrow direction, so that the object images are recorded by the recording device 12. Reference numeral 18 denotes a sub mirror and numeral 19 represents a focal point detector.

In such a manner, by incorporating the zoom lens according to at least one exemplary embodiment of the present invention into an image-pickup device, such as a single lens reflex camera interchangeable lens, an image-pickup apparatus with high optical performances can be achieved. The present invention can also be applied to a single lens camera without a quick return mirror in the same way.

According to the exemplary embodiments described above, by moving part of lens groups constituting the zoom lens so as to have a component perpendicular to the optical axis, image blur generated when the zoom lens is vibrated (tilted) is optically corrected so as to have corrected photographic images. Thus, an image-pickup apparatus with stabilized photographic images, such as a photographic camera, a video camera, an electronic still camera, and a digital camera, can be obtained.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims the benefit of Japanese Application No. 2005-263889 filed Sep. 12, 2005, which is hereby incorporated by reference herein in its entirety.

What is claimed is:

1. A zoom lens comprising:
a first lens group with negative refractive power;
a second lens group with positive refractive power;
a third lens group with negative refractive power; and
a fourth lens group with positive refractive power, which are arranged from an object side to an image side in that order,
wherein each of the lens groups moves so that the space between the first lens group and the second lens group is reduced, the space between the second lens group and the third lens group is increased, and the space between the third lens group and the fourth lens group is reduced, at a telephoto end in comparison with spacing at a wide angle end,
wherein the second lens group includes a second A lens component composed of a single positive lens, and a second B lens component composed of a negative lens and a positive lens with positive refractive power as a whole, which are arranged from the object side to the image side in that order, the second A lens component displacing images in a direction substantially perpendicular to an optical axis by having a component of it's displacement perpendicular to the optical axis, and
wherein the zoom lens satisfies the following condition:

$$0.2 < f2/f2A < 0.6,$$

where f2A and f2 are focal lengths of the second A lens component and the second lens group, respectively.

2. The zoom lens according to claim 1, wherein the zoom lens satisfies the following condition:

$$0.05 < d2A/fw < 0.2,$$

where d2A is the thickness of the positive lens of the second A lens component and fw is the focal length of the entire system at the wide angle end.

3. The zoom lens according to claim 1, wherein the zoom lens satisfies the following condition:

$$55 < V2A < 85,$$

where V2A is the Abbe number of the positive lens material of the second A lens component.

4. The zoom lens according to claim 1, wherein the zoom lens satisfies the following condition:

$$0.4 < (Vp-Vn)/V2A < 0.7,$$

where V2A is the Abbe number of the positive lens material of the second A lens component, and Vn and Vp are the Abbe numbers of the negative lens material and the positive lens material of the second B lens component, respectively.

5. The zoom lens according to claim 1, further comprising an aperture stop arranged adjacent to an image plane of the second lens group,
wherein the aperture stop moves integrally with the second lens group during zooming.

6. The zoom lens according to claim 1, wherein the zoom lens satisfies the following condition:

$$2.4 < ft/fw < 4.0,$$

where fw and ft are the focal lengths of the entire system at the wide angle end and at the telephoto end, respectively.

7. The zoom lens according to claim 1, wherein the zoom lens satisfies the following condition:

$$0.30 < fw/bfw < 0.70,$$

where bfw is the back focus at the wide angle end and fw is the focal length of the entire system at the wide angle end.

8. The zoom lens according to claim 1, wherein the zoom lens satisfies the following condition:

$$0.15 < d23w/fw < 0.40,$$

where d23w is the axial air space between the second lens group and the third lens group at the wide angle end and fw is the focal length of the entire system at the wide angle end.

9. The zoom lens according to claim 1, wherein the zoom lens satisfies the following condition:

$$1.5 < fw/f4 < 2.6,$$

where f4 is the focal length of the fourth lens group and fw is the focal length of the entire system at the wide angle end.

10. The zoom lens according to claim 1, wherein images are formed on a solid state image-pickup device.

11. An image-pickup apparatus comprising;
the zoom lens according to claim 1; and
a solid state image-pickup device for receiving images thereon formed by the zoom lens.

12. A zoom lens according to claim 1, wherein the zoom lens additionally satisfies the following conditions:

$$0.4 < LP/fw < 1.0,$$

wherein LP is the distance along the optical axis between the lens surface closest to the image side of the second A lens component and the aperture stop; and fw is the focal length of the entire system at the wide angle end.

* * * * *